US011750559B2

(12) United States Patent
Nakatsukasa et al.

(10) Patent No.: US 11,750,559 B2
(45) Date of Patent: Sep. 5, 2023

(54) EDGE SWITCHING SYSTEM, EDGE SWITCHING DEVICE, EDGE SWITCHING METHOD, AND PROGRAM

(71) Applicant: Nippon Telegraph and Telephone Corporation, Tokyo (JP)

(72) Inventors: Satoshi Nakatsukasa, Musashino (JP); Ken Takahashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/776,278

(22) PCT Filed: Nov. 15, 2019

(86) PCT No.: PCT/JP2019/044849
§ 371 (c)(1),
(2) Date: May 12, 2022

(87) PCT Pub. No.: WO2021/095226
PCT Pub. Date: May 20, 2021

(65) Prior Publication Data
US 2022/0394011 A1 Dec. 8, 2022

(51) Int. Cl.
*H04L 61/5014* (2022.01)
*H04L 61/5053* (2022.01)
*H04L 61/5076* (2022.01)

(52) U.S. Cl.
CPC ...... *H04L 61/5014* (2022.05); *H04L 61/5053* (2022.05); *H04L 61/5076* (2022.05)

(58) Field of Classification Search
CPC ............. H04L 61/5014; H04L 61/5053; H04L 61/5076
USPC ........................................................ 709/245
See application file for complete search history.

(56) References Cited

U.S. PATENT DOCUMENTS

| 6,393,484 | B1* | 5/2002 | Massarani | ............... H04L 61/35 709/227 |
| 6,807,184 | B2* | 10/2004 | Gutknecht | .......... H04L 12/2898 370/401 |
| 7,779,095 | B2* | 8/2010 | Hayashi | .................. H04L 67/14 709/217 |

(Continued)

FOREIGN PATENT DOCUMENTS

JP 201346176 3/2013

*Primary Examiner* — Tauqir Hussain
(74) *Attorney, Agent, or Firm* — Fish & Richardson P.C.

(57) ABSTRACT

An edge switching device of an edge switching system includes: a remaining lease time information obtainment unit configured to obtain remaining lease time information for each of user terminals from a DHCP server; a submission order determination unit configured to determine a submission order for user configuration information in order from a shortest remaining lease time; a user configuration information submission unit configured to submit, to a backup system edge router, user configuration information of each of the user terminals, according to the determined submission order; and a reconnection inducement instruction unit configured to send, to the DHCP server, an instruction to send reconnection inducement information to the user terminals for which the user configuration information has been submitted.

7 Claims, 14 Drawing Sheets

(56) References Cited

U.S. PATENT DOCUMENTS

| | | | | |
|---|---|---|---|---|
| 7,792,942 B1* | 9/2010 | Regan | H04L 61/5053 | 370/254 |
| 8,005,096 B2* | 8/2011 | Hardy | H04L 45/00 | 370/395.5 |
| 8,312,270 B1* | 11/2012 | Chou | H04L 63/101 | 713/168 |
| 8,391,218 B1* | 3/2013 | Joshi | H04W 40/02 | 370/329 |
| 10,063,455 B2* | 8/2018 | Bonen | H04L 45/02 | |
| 10,148,754 B1* | 12/2018 | Eggleston | H04L 69/28 | |
| 10,367,676 B1* | 7/2019 | Vermeulen | H04L 41/30 | |
| 10,819,676 B1* | 10/2020 | Kolanowski | H04W 4/50 | |
| 11,520,637 B2* | 12/2022 | Nakamura | G06F 9/455 | |
| 11,552,927 B1* | 1/2023 | Theogaraj | H04L 43/0882 | |
| 11,606,333 B1* | 3/2023 | Sajassi | H04L 63/101 | |
| 2003/0133450 A1* | 7/2003 | Baum | H04L 45/742 | 370/389 |
| 2004/0071164 A1* | 4/2004 | Baum | H04L 45/54 | 370/469 |
| 2004/0111640 A1* | 6/2004 | Baum | H04L 63/1408 | 709/224 |
| 2005/0188069 A1* | 8/2005 | Mohandas | H04L 61/5014 | 709/223 |
| 2005/0286518 A1* | 12/2005 | Park | H04L 61/5014 | 370/389 |
| 2006/0218252 A1* | 9/2006 | Ford | H04L 69/40 | 709/223 |
| 2007/0011725 A1* | 1/2007 | Sahay | H04W 12/08 | 726/4 |
| 2008/0008197 A1* | 1/2008 | Sakanashi | H04L 61/5014 | 370/395.52 |
| 2008/0183769 A1* | 7/2008 | Regan | H04L 12/2856 | |
| 2009/0006635 A1* | 1/2009 | Siegmund | H04L 41/00 | 709/228 |
| 2012/0246282 A1* | 9/2012 | Oguchi | H04L 12/66 | 709/221 |
| 2013/0080614 A1* | 3/2013 | Iyer | H04L 67/54 | 709/223 |
| 2013/0111008 A1* | 5/2013 | Black | H04L 43/04 | 709/224 |
| 2014/0297890 A1* | 10/2014 | Boddu | H04L 61/5014 | 709/245 |
| 2015/0124823 A1* | 5/2015 | Pani | H04L 41/0836 | 370/392 |
| 2016/0099912 A1* | 4/2016 | Wells | H04L 61/5053 | 709/226 |
| 2016/0099931 A1* | 4/2016 | Nethi | H04L 63/0815 | 726/8 |
| 2019/0028540 A1* | 1/2019 | Eggleston | H04L 67/1097 | |
| 2019/0097966 A1* | 3/2019 | Hu | H04L 61/5014 | |
| 2019/0297102 A1* | 9/2019 | Davis, III | H04L 63/1416 | |
| 2019/0334858 A1* | 10/2019 | Lee | H04L 61/5061 | |
| 2019/0334859 A1* | 10/2019 | Kannan | H04L 61/5061 | |
| 2020/0145370 A1* | 5/2020 | Zhang | H04L 61/5076 | |
| 2020/0213226 A1* | 7/2020 | Zheng | H04L 45/036 | |
| 2020/0322283 A1* | 10/2020 | Osterlund | H04L 47/283 | |
| 2020/0322871 A1* | 10/2020 | Ernst | H04W 40/32 | |
| 2021/0006534 A1* | 1/2021 | Weber | H04L 61/5014 | |
| 2021/0119965 A1* | 4/2021 | Meng | H04L 61/5053 | |
| 2021/0400015 A1* | 12/2021 | Theogaraj | H04L 61/5076 | |
| 2023/0078802 A1* | 3/2023 | Wang | G06Q 50/12 | |

* cited by examiner

EDGE SWITCHING SYSTEM, EDGE SWITCHING DEVICE, EDGE SWITCHING METHOD, AND PROGRAM

CROSS-REFERENCE TO RELATED APPLICATIONS

This application is a National Stage application under 35 U.S.C. § 371 of International Application No. PCT/JP2019/044849, having an International Filing Date of Nov. 15, 2019, the disclosure of which is considered part of the disclosure of this application, and is incorporated in its entirety into this application.

TECHNICAL FIELD

The present invention relates to an edge switching system, an edge switching device, an edge switching method, and a program that switch to an edge router of a backup system when a failure occurs in an edge router of an active system in a network of a telecommunications carrier or the like.

BACKGROUND ART

As illustrated in FIG. 1, in a network of a telecommunications carrier or the like, an edge router 2 identifies user terminals 4 and distributes the traffic of each user terminal 4 to an Internet network 5, a service distribution server 6, and the like. The edge router 2 stores user configuration information 210 necessary for each user terminal 4 handled thereby to use a service. By sending an address request message (DHCP Discover) to a DHCP server 3 through the edge router 2 using the DHCP (Dynamic Host Configuration Protocol) address allocation protocol, the user terminal 4 receives an IP address (called simply an "address" hereinafter) and starts communication.

The edge router 2 has a backup unit in case of failure due to a malfunction or the like, and redundancy ensures the reliability of the network.

As illustrated in FIG. 2, when a failure occurs in the edge router 2 of an active system (the edge router of the active system will be referred to here as an "active system edge router 2A") (step S1), a switch from the edge router of the active system to the edge router of a backup system (the edge router of the backup system will be referred to here as a "backup system edge router 2B") is performed (step S2). Then, the user configuration information 210 of each user terminal 4 handled by the active system edge router 2A is set in the backup system edge router 2B. Then, by sending an address request message to the DHCP server 3 via the backup system edge router 2B, the user terminal 4 accepts an address allocation (step S3). Communication with that user terminal 4 is then resumed via the backup system edge router 2B (step S4).

The method described in PTL 1, for example, has been disclosed as a conventional technique pertaining to switching from the active system edge router 2A to the backup system edge router 2B. In the method described in PTL 1, when a switch occurs, an address reconfiguration inducement message (e.g., DHCP ForceRenew) is sent to the user device that has been using the router of the active system to induce the user device to reconfigure its IP address. Then, each user terminal resumes communication by sending an address re-request message (e.g., DHCP Renew) to the router of the backup system.

CITATION LIST

Patent Literature

[PTL 1] JP 2013-046176A

SUMMARY OF THE INVENTION

Technical Problem

Before explaining the issues to be addressed by the present invention when switching from the active system edge router 2A to the backup system edge router 2B in the network configuration illustrated in FIG. 2, assumptions made in the present invention will be described.

(1) A user terminal obtains an IP address and starts communication by sending an address request message (e.g., DHCP Discover) in the address allocation protocol through DHCP to a DHCP server via an edge router. (2) The user terminals do not have a mechanism for detecting a failure in an edge router.

Normally, when no failure has occurred, the user terminal is assigned a lease time (lease period) for the address allocated through DHCP, and thus the address can no longer be used once the lease time has passed. Therefore, the user terminal sends an address re-request message (e.g., DHCP Renew) to the edge router (of the active system). When a failure occurs in the edge router (of the active system), the user terminal detects the occurrence of the failure in the edge router by means of a DHCP Renew timeout and starts sending an address request message (e.g., DHCP Discover) so that the address is re-allocated. Here, the edge router of the backup system is assumed to be in the same L2 (Layer 2) segment as the edge router of the active system, and is assumed to be capable of receiving a broadcasted DHCP Discover. If at this point in time the user configuration information of the user terminal has already been configured for the edge router of the backup system, the user terminal can accept an address allocation from the DHCP server. On the other hand, if no user configuration information has been configured in the edge router of the backup system, the allocation will fail and a DHCP Discover will be retried at predetermined intervals. In such a case, the CPU resources of the edge router will be consumed unnecessarily. In addition, even though the stated user terminal has already been connected to the edge router of the backup system and preparations for recovery are complete, the period of the failure will be prolonged due to the fact that the edge router of the backup system has not been configured with the user configuration information for that user terminal.

The flow of the stated processing will be described in detail with reference to FIG. 3.

FIG. 3 is a sequence chart illustrating an issue when switching from the edge router of the active system to the edge router of the backup system in the conventional technique.

Here, as illustrated in FIG. 3, user terminal 4-1 to user terminal 4-100 are handled by the active system edge router 2A, and communication is started after receiving address allocations from the DHCP server 3 via the edge routers 2 (2A and 2B). The system also includes an edge switching device 1. This edge switching device 1 monitors for malfunctions in the edge routers 2 and switches to the backup system edge router 2B when a failure occurs in the active system edge router 2A. At this time, the edge switching device 1 executes processing for sequentially submitting the user configuration information of each user terminal 4 that had been handled by the active system edge router 2A to the backup system edge router 2B.

First, as illustrated in FIG. 3, when the address lease period from the DHCP server 3 runs out, the user terminal 4-1 sends an address re-request message (DHCP Renew) to the DHCP server 3 via the active system edge router 2A (steps S10 and S11).

After receiving the address re-request message (DHCP Renew), the DHCP server 3 sends response information including an extended lease period (T) along with information allowing the extension of the address lease period to the user terminal 4-1 via the active system edge router 2A (steps S12 and S13).

Note that because each user terminal 4 sends an address re-request message (DHCP Renew) to the DHCP server 3 at different times, at a certain point in time, the lease time remaining in the address lease period (T) (referred to as the "remaining lease time" hereinafter) is different for each user terminal 4.

Assume here that a failure has occurred in the active system edge router 2A.

The edge switching device 1 detects the failure in the active system edge router 2A through a failure notification from the active system edge router 2A, a failure to obtain existence confirmation information at predetermined intervals from the active system edge router 2A, and the like (step S14).

Having detected a failure, the edge switching device 1 executes a switch from the active system edge router 2A to the backup system edge router 2B. Specifically, the edge switching device 1 sequentially submits the user configuration information of each user terminal 4 (the user terminals 4-1 to 4-100) that had been handled by the active system edge router 2A to the backup system edge router 2B (step S15: sign α).

On the other hand, for example, when the lease period (T) has run out for the user terminal 4-100, the user terminal 4-100 sends an address re-request message (DHCP Renew) to the active system edge router 2A (step S16). However, because a failure has occurred in the active system edge router 2A, an address cannot be obtained from the DHCP server 3, resulting in a timeout. As a result, the user terminal 4-100 detects the occurrence of the failure in the active system edge router 2A and sends an address request message (DHCP Discover) in order to redo the address allocation (step S17). Note that the address request message (DHCP Discover) sent by the user terminal 4-100 is broadcast and therefore reaches the backup system edge router 2B.

Upon receiving the address request message (DHCP Discover), the backup system edge router 2B discards the address request if the user configuration information of the user terminal 4 that sent the address request message (DHCP Discover) has not been configured (step S18).

The user terminal 4-100 continues to send the address request message (DHCP Discover) at predetermined intervals until the address is successfully allocated by the DHCP server 3. Each time, the backup system edge router 2B, to which the user configuration information has not yet been submitted, continues to discard the address request. The CPU resources of the backup system edge router 2B will therefore be consumed unnecessarily.

If, after the user configuration information of the user terminal 4-100 is submitted from the edge switching device 1 to the backup system edge router 2B (step S15x), an address request message (DHCP Discover) from the user terminal 4-100 is received (step S17x), the address allocation can be accepted from a DHCP server 3a (steps S19 to S21).

On the other hand, when the lease period (T) has run out for the user terminal 4-1, the user terminal 4-1 sends an address re-request message (DHCP Renew) to the active system edge router 2A (step S22). However, because a failure has occurred in the active system edge router 2A, an address cannot be obtained from the DHCP server 3, resulting in a timeout. As a result, the user terminal 4-1 detects the occurrence of the failure in the active system edge router 2A and broadcasts an address request message (DHCP Discover) to the backup system edge router 2B in order to redo the address allocation (step S23).

Because the user configuration information of the user terminal 4-1 has already been submitted to the backup system edge router 2B, the address is allocated from the DHCP server 3 via the backup system edge router 2B (steps S24 to S26).

The user terminal 4 has no way to detect the failure in the active system edge router 2A until the lease period has run out. In the example of the user terminal 4-1, even though the user configuration information of the user terminal 4-1 has already been submitted to the backup system edge router 2B after the switch and preparations for recovery are complete, the recovery is delayed and the failure period is therefore prolonged.

The present invention has been achieved in light of such circumstances, and the present invention reduces a load on edge routers and reduces a delay in recovery when performing processing for switching from an edge router of an active system to an edge router of a backup system.

Means for Solving the Problem

An edge switching system according to the present invention is an edge switching system including an edge switching device and a DHCP server, the edge switching device switching between an edge router of an active system and an edge router of a backup system, and the DHCP server allocating addresses in response to requests from a plurality of user terminals via the edge routers. The DHCP server includes: a storage unit that stores, for each of the user terminals, remaining lease time information pertaining to a remaining time of an address lease period that allows the addresses to be used by the user terminals; a lease period management unit that sends the remaining lease time information for each of the user terminals to the edge switching device; and a reconnection inducement unit that accepts, from the edge switching device, an instruction to send reconnection inducement information inducing the user terminals to reconnect to the edge routers, and sends the reconnection inducement information to the user terminals. The edge switching device includes: a remaining lease time information obtainment unit that obtains, from the DHCP server, the remaining lease time information for each of the user terminals when switching from the edge router of the active system to the edge router of the backup system; a submission order determination unit that specifies a remaining lease time of each of the user terminals using the remaining lease time information, and determines a submission order of user configuration information in order from a shortest remaining lease time; a user configuration information submission unit that submits user configuration information of each of the user terminals to the edge router of the backup system in accordance with the determined submission order; and a reconnection inducement instruction unit that sends, to the DHCP server, an instruction to send the reconnection inducement information for the user terminals for which the user configuration information has been submitted.

Effects of the Invention

According to the present invention, a load on edge routers can be reduced and a delay in recovery can be reduced when performing processing for switching from an edge router of an active system to an edge router of a backup system.

DESCRIPTION OF EMBODIMENTS

Before describing an embodiment for carrying out the present invention (referred to "the present embodiment" hereinafter), a comparative example of the present embodiment will be described.

Figure 4:
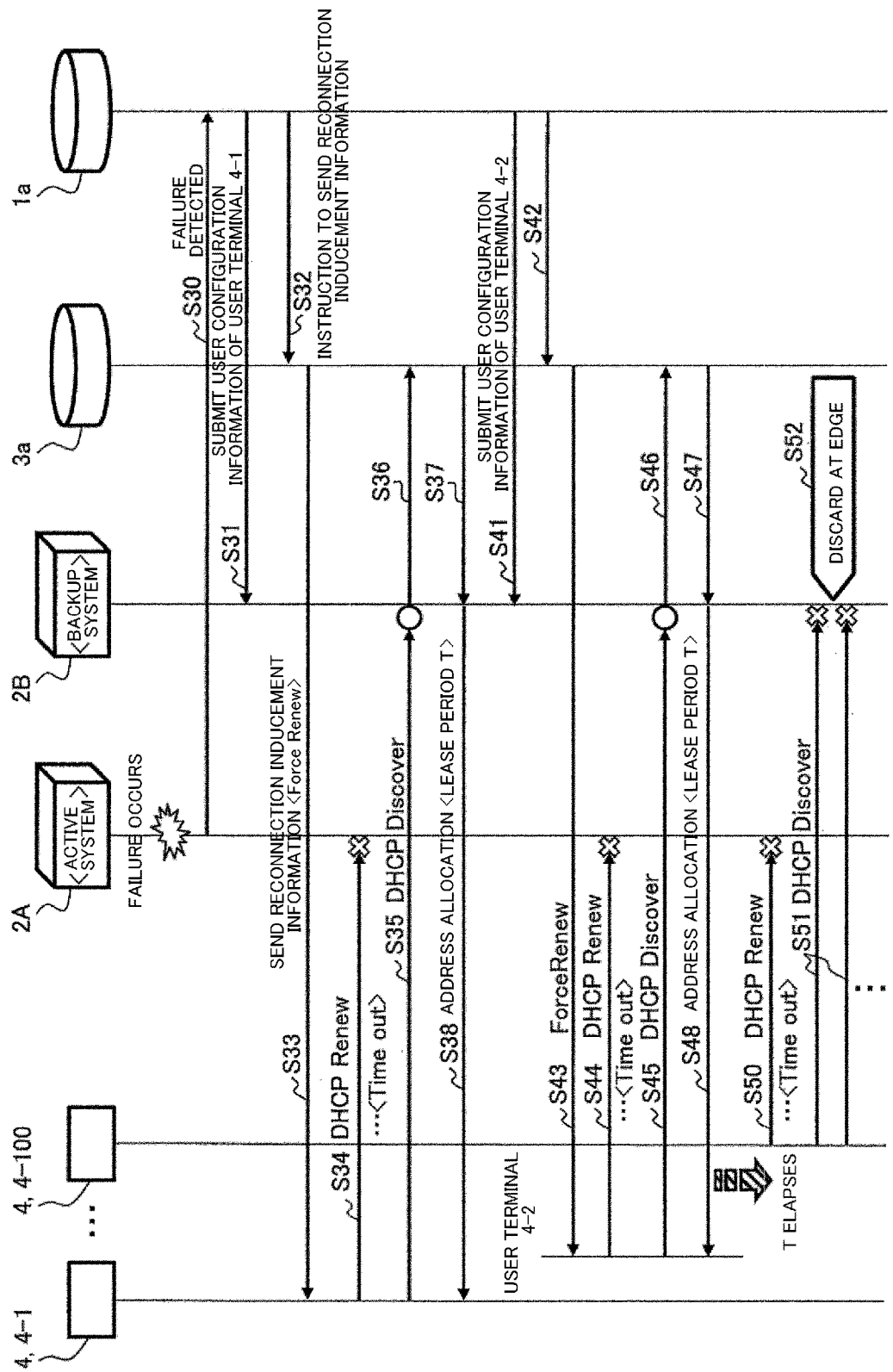
FIG. 4 is a sequence chart illustrating a flow of processing for switching from an active system edge router to a backup system edge router in a comparative example according to an embodiment.

FIG. 4 is a sequence chart illustrating a flow of processing for switching from an active system edge router 2A to a backup system edge router 2B in the comparative example of the present embodiment.

Figure 1:
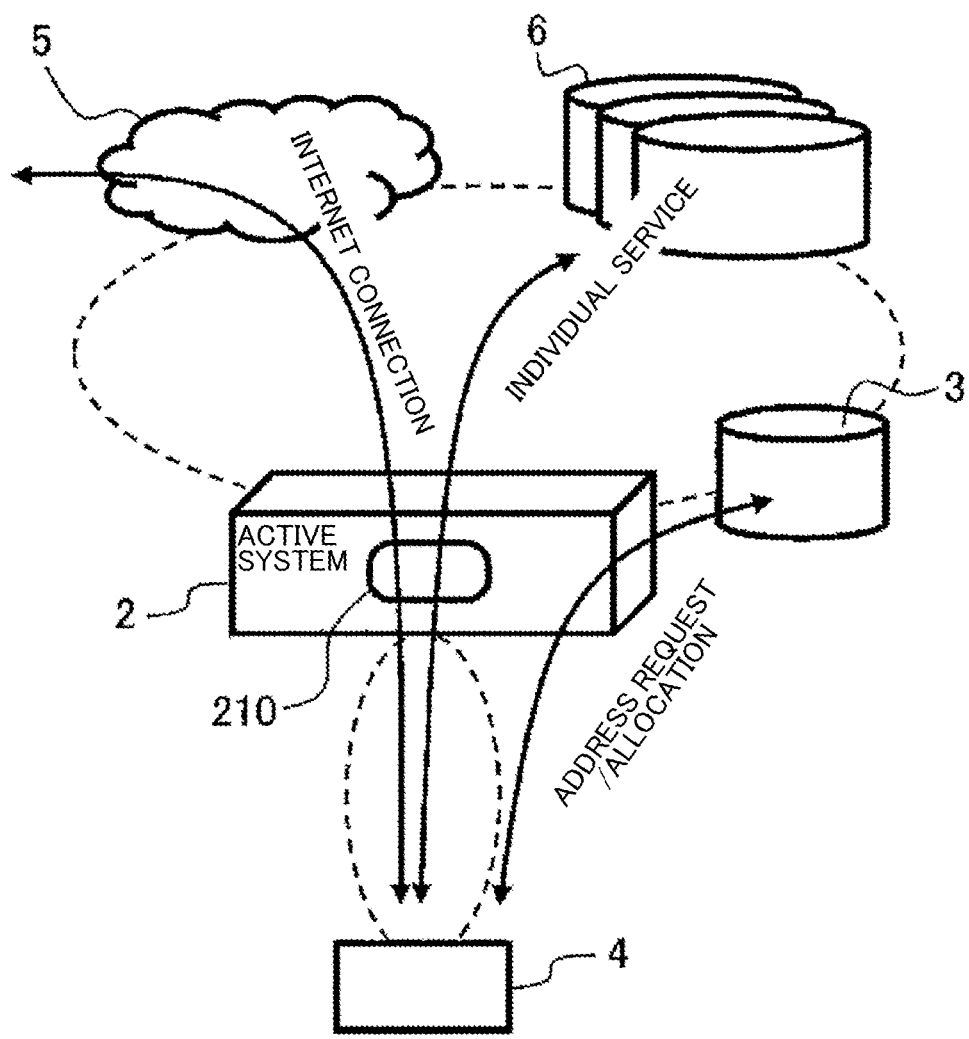
FIG. 1 is a diagram illustrating a conventional configuration in which a user terminal accepts the provision of a service via an edge router in a communication network.
Figure 2:
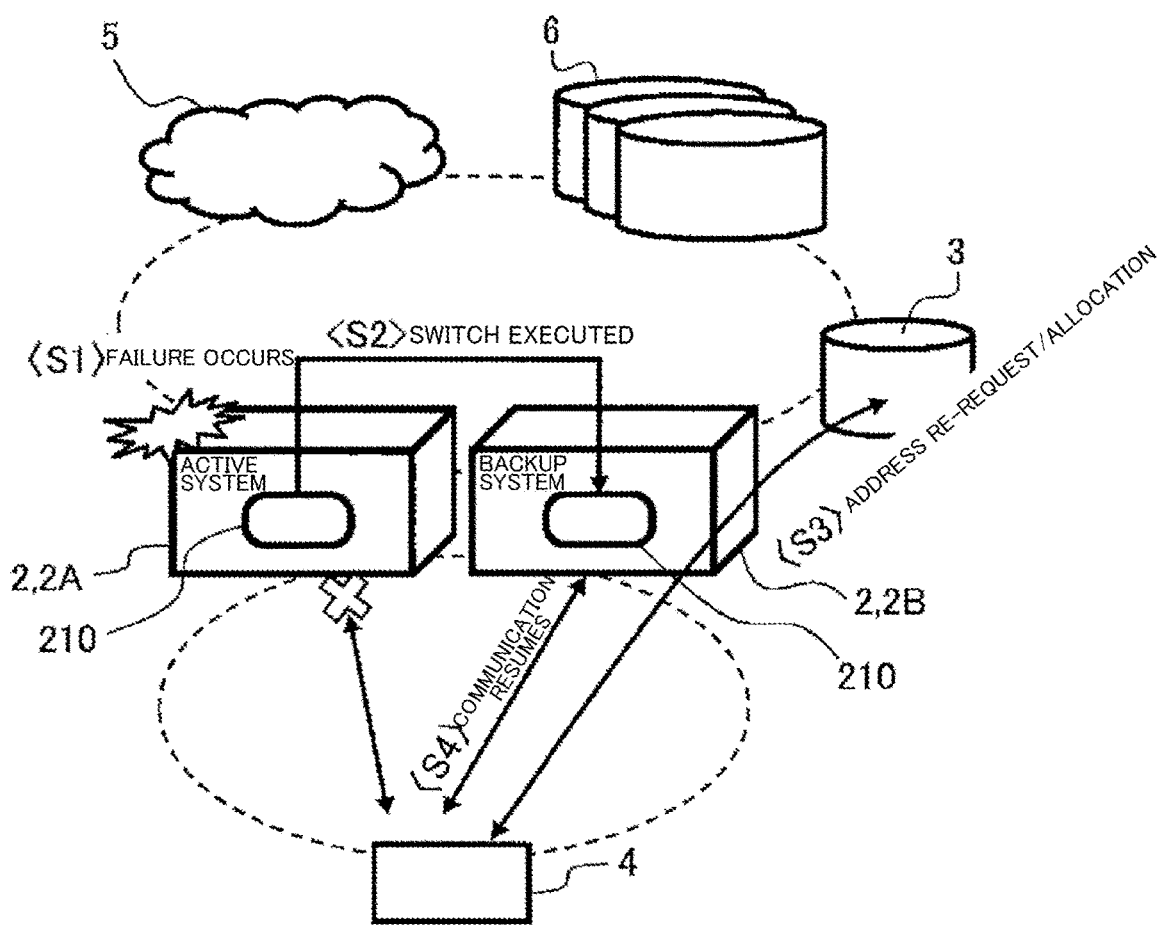
FIG. 2 is a diagram illustrating conventional processing for switching to a backup system router when a failure occurs in an active system edge router in the communication network.
Figure 3:
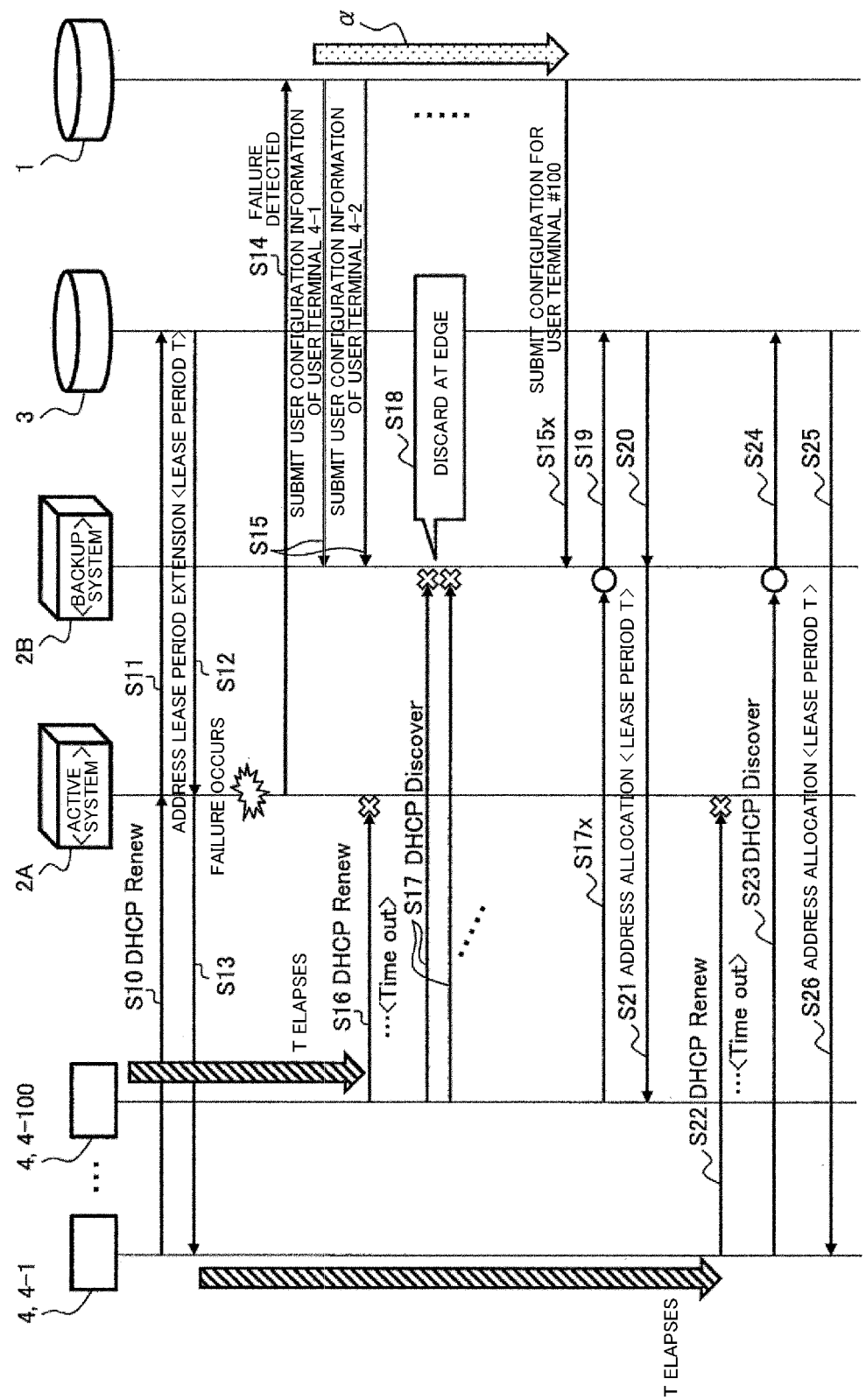
FIG. 3 is a sequence chart illustrating an issue when switching from an active system edge router to a backup system edge router in the conventional technique.

The system illustrated in FIG. 4 has the same configuration as the system illustrated in FIG. 3, with the difference that in FIG. 4, a DHCP server 3a and an edge switching device 1a are used.

The edge switching device 1a detects the occurrence of a failure in the active system edge router 2A, and each time the user configuration information of each user terminal 4 is submitted to the backup system edge router 2B, sends, to the DHCP server 3a, an instruction to send information that induces a reconnection of the user terminal 4 (referred to as "reconnection inducement information" hereinafter). Upon receiving an instruction to send the reconnection inducement information, the DHCP server 3a sends the reconnection inducement information (e.g., DHCP ForceRenew), for inducing the reconfiguration of the address, to the user terminal 4 handled by the active system edge router 2A. By doing so, an attempt will be made to immediately restore communication to user terminals to which communication can be restored. This will be described in detail below.

As illustrated in FIG. 4, when a failure occurs in the active system edge router 2A, the edge switching device 1A detects the occurrence of the failure in the active system edge router 2A through a failure notification or the like from the active system edge router 2A (step S30).

Next, having detected the failure, the edge switching device 1a executes a switch from the active system edge router 2A to the backup system edge router 2B. Specifically, the edge switching device 1a sequentially submits the user configuration information of each user terminal 4 (the user terminals 4-1 to 4-100) that had been handled by the active system edge router 2A to the backup system edge router 2B. Here, the descriptions will assume that the user configuration information is submitted in the order of the user terminal 4-1 to the user terminal 4-100.

The edge switching device 1a first sends the user configuration information of the user terminal 4-1 to the backup system edge router 2B (step S31). As a result, the backup system edge router 2B stores the user configuration information of the user terminal 4-1 in itself.

Next, the edge switching device 1a sends, to the DHCP server 3, an instruction to send the reconnection inducement information to the user terminal 4-1 (step S32).

Having received the instruction to send the reconnection inducement information, the DHCP server 3 sends the reconnection inducement information (e.g., DHCP ForceRenew) to the user terminal 4-1 (step S33).

Having received the reconnection inducement information, the user terminal 4-1 sends an address re-request message (DHCP Renew) to the active system edge router 2A (step S34). However, because a failure has occurred in the active system edge router 2A, an address cannot be obtained, resulting in a timeout. Accordingly, the user terminal 4-1 detects the occurrence of the failure in the active system edge router 2A and broadcasts an address request message (DHCP Discover) in order to redo the address allocation (step S35). The backup system edge router 2B receives the address request message (DHCP Discover) as a result.

Because the user configuration information of the user terminal 4-1 has already been submitted to the backup system edge router 2B, the address is allocated from the DHCP server 3a via the backup system edge router 2B (steps S36 to S38).

For the user terminals 4-2 and on, the user configuration information is submitted to the backup system edge router 2B, and address allocation using the address request message (DHCP Discover) is performed by sending the reconnection inducement information to the corresponding user terminal 4, sequentially in the same manner (steps S41 to S48).

However, if the lease period runs out before the user configuration information is submitted to the backup system edge router 2B, the backup system edge router 2B, to which the user configuration information has not yet been submitted, will continue to discard the address request, in the same manner as in step S18 in FIG. 3.

In the example in FIG. 4, when the lease period (T) has run out for the user terminal 4-100, an address re-request message (DHCP Renew) is sent to the active system edge router 2A (step S50). However, because a failure has occurred in the active system edge router 2A, an address cannot be obtained from the DHCP server 3a, resulting in a timeout. As a result, the user terminal 4-100 detects the occurrence of the failure in the active system edge router 2A and sends an address request message (DHCP Discover) in order to redo the address allocation (step S51).

However, the user configuration information of the user terminal 4-100 has not yet been submitted to the backup system edge router 2B. Accordingly, the user terminal 4-100 cannot accept the allocation of an address, and continues to send the address request message (DHCP Discover) at predetermined intervals until the address is successfully allocated by the DHCP server 3a. Each time, the backup system edge router 2B, to which the user configuration information has not yet been submitted, continues to discard the address request (step S52). The CPU resources of the backup system edge router 2B will therefore be consumed unnecessarily.

Particularly in cases where the edge router handles a large number of user terminals 4 or the lease period of addresses is short, the problem of wasting CPU resources of the edge routers 2 by retrying the DHCP address request messages cannot be solved, in the same manner as in the example illustrated in FIG. 3.

EMBODIMENT

Edge switching processing performed by an edge switching system according to embodiments will be described below as first and second embodiments.

First Embodiment

First, an edge switching system 1000 including an edge switching device 10 according to the first embodiment will be described with reference to FIG. 5.

The edge switching device 10 of the edge switching system 1000 according to the first embodiment obtains information on the remaining lease time of each of user terminals 4 from a DHCP server 30. The edge switching device 10 then submits user configuration information to a backup system edge router 2B in the order from the user terminal 4 having the shortest remaining lease time.

This makes it possible to reduce situations in which a user terminal 4 sends DHCP address request messages to the backup system edge router 2B without having submitted its own user configuration information, which in turn makes it possible to reduce the load on the backup system edge router 2B.

Figure 5:
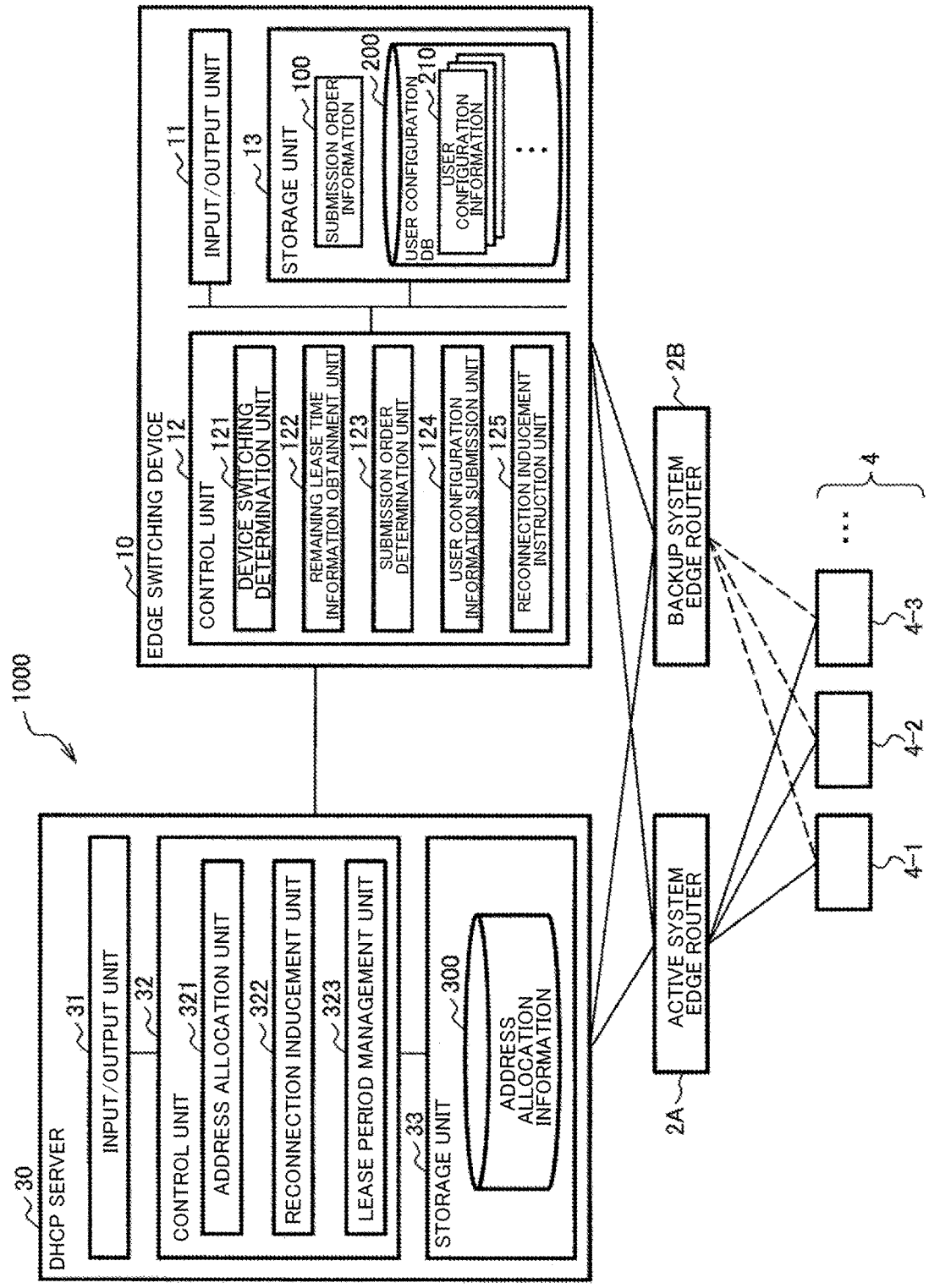
FIG. 5 is a diagram illustrating the overall configuration of an edge switching system including an edge switching device according to a first embodiment of the present invention.

FIG. 5 is a diagram illustrating the overall configuration of the edge switching system 1000 including the edge switching device 10 according to the first embodiment of the present invention.

The edge switching system 1000 is configured including the DHCP server 30 and the edge switching device 10. The edge switching device 10 and the DHCP server 30 are communicatively connected, and each is communicatively connected to an active system edge router 2A and the backup system edge router 2B on a network. The active system edge router 2A handles the user terminals 4 (4-1, 4-2, and so on). The edge switching device 10 executes processing for switching from the active system edge router 2A to the backup system edge router 2B when the occurrence of a failure has been detected in the active system edge router 2A.

The DHCP server 30 and the edge switching device 10 constituting the edge switching system 1000 will be described in detail hereinafter.

DHCP Server

The DHCP server 30 is a server that assigns IP addresses to the user terminals 4. The DHCP server 30 according to the present embodiment has a feature of returning information about the remaining lease time of each user terminal 4 in response to a request from the edge switching device 10.

As illustrated in FIG. 5, the DHCP server 30 is configured including an input/output unit 31, a control unit 32, and a storage unit 33.

The input/output unit 31 is constituted by a communication interface for sending and receiving information to and from the edge switching device 10, the edge routers 2 (the active system edge router 2A and the backup system edge router 2B), and the like, and an input/output interface for sending and receiving information to and from input devices such as touch panels and keyboards, output devices such as monitors, and so on.

The storage unit 33 is constituted by flash memory, a hard disk, RAM (Random Access Memory), or the like. Address allocation information 300 (FIG. 6) and the like, described later, are stored in the storage unit 33 of the DHCP server 30. Programs for causing various functions of the control unit 32 to be executed, information necessary for processing by the control unit 32, and the like are also temporarily stored in the storage unit 33.

The control unit 32 controls the overall processing of the DHCP server 30, and is configured including an address allocation unit 321, a reconnection inducement unit 322, and a lease period management unit 323.

When an address request message (e.g., DHCP Discover) is obtained from a user terminal 4 via an edge router 2, the address allocation unit 321 performs processing for allocating an IP address to the user terminal 4 via the edge router 2.

When an instruction to send reconnection inducement information is sent from the edge switching device 10 to a user terminal 4, the reconnection inducement unit 322 sends the reconnection inducement information (e.g., DHCP ForceeRenew) to that user terminal 4. The user terminal 4 that is the destination is the user terminal 4 for which the user configuration information has been submitted to the backup system edge router 2B. Having obtained this reconnection inducement information, the user terminal 4 executes processing for sending an address re-request message (e.g., DHCP Renew) to the active system edge router 2A.

The lease period management unit 323 receives the address request message (DHCP Discover), the address re-request message (DHCP Renew), and the like from the user terminal 4, and when an IP address is allocated, stores information about the address allocation as the address allocation information 300.

Figure 6:
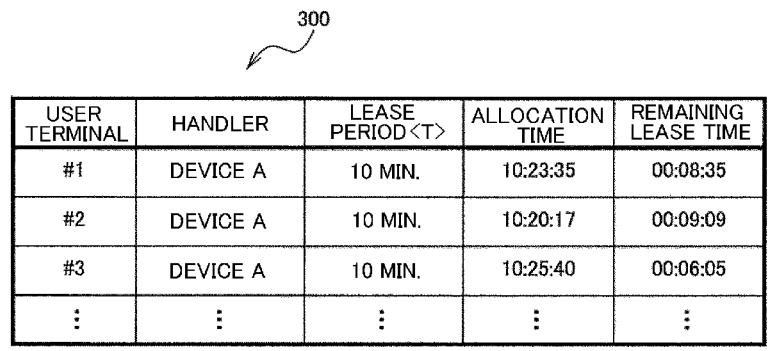
FIG. 6 is a diagram illustrating an example of the data structure of address allocation information according to the first embodiment of the present invention.

FIG. 6 is a diagram illustrating an example of the data structure of the address allocation information 300 according to the first embodiment of the present invention.

As illustrated in FIG. 6, the address allocation information 300 stores, in association with an ID of the user terminal 4, an ID of the edge router 2 which is to handle the user terminal 4, the lease period (T) of the address, and information of an allocation time of the address.

For example, an ID "Device A" of the active system edge router 2A is stored as the edge router 2 to handle the user terminal 4, in association with an ID "#1" of the user terminal 4 (e.g., the user terminal 4-1). In addition, "10 minutes" is stored as the lease period (T) of the address. The time when the address is allocated is stored as "10:23:35" (hour 10, minute 23, second 35). As illustrated in FIG. 6, the remaining lease time may be stored in the address allocation information 300. This remaining lease time is a remaining lease time obtained by subtracting the allocation time from the current time, and then subtracting the resulting elapsed time from the lease period (T).

The lease period management unit 323 receives a remaining lease time obtainment request from the edge switching device 10. Upon doing so, the lease period management unit 323 refers to the address allocation information 300 (FIG. 6) and sends the information of the lease period (T) of the address and the allocation time of the address to the edge switching device 10 as the remaining lease time information. If the information of the remaining lease time is stored in the address allocation information 300, the lease period management unit 323 sends that remaining lease time to the edge switching device 10 as the remaining lease time information.

In this manner, the DHCP server 30 includes a function for responding with remaining lease period information of each user terminal 4 in response to a request from the edge switching device 10.

Edge Switching Device

The edge switching device 10 will be described next.

The edge switching device 10 according to the first embodiment of the present invention has a feature of obtaining information pertaining to the remaining lease time of each user terminal 4 from the DHCP server 30 and determining a submission order, in order from the shortest remaining lease time.

As illustrated in FIG. 5, the edge switching device 10 is configured including an input/output unit 11, a control unit 12, and a storage unit 13.

The input/output unit 11 is constituted by a communication interface for sending and receiving information to and from the DHCP server 30, the edge routers 2 (the active system edge router 2A and the backup system edge router 2B), and the like, and an input/output interface for sending and receiving information to and from input devices such as touch panels and keyboards, output devices such as monitors, and so on.

The storage unit 13 is constituted by flash memory, a hard disk, RAM, or the like. Submission order information (FIG. 7), described later, a user configuration DB (DataBase) 200 in which the user configuration information 210 of each user terminal 4 is held, and the like are stored in the storage unit 13 of the edge switching device 10. Programs for causing various functions of the control unit 12 to be executed, information necessary for processing by the control unit 12, and the like are also temporarily stored in the storage unit 13.

The control unit 12 controls the overall processing of the edge switching device 10, and is configured including a device switching determination unit 121, a remaining lease time information obtainment unit 122, a submission order determination unit 123, a user configuration information submission unit 124, and a reconnection inducement instruction unit 125.

The device switching determination unit 121 detects the occurrence of a failure in an edge router 2 on the basis of the obtainment of malfunction information from the edge router 2, not receiving an existence confirmation message from the edge router 2, or the like. If the edge router 2 in which the occurrence of a failure is detected is the active system edge router 2A, the device switching determination unit 121 determines the backup system edge router 2B corresponding to that active system edge router 2A as the device to which a switch is to be made.

The remaining lease time information obtainment unit 122 sends the remaining lease time obtainment request to the DHCP server 30 when the device switching determination unit 121 detects the occurrence of a failure in the active system edge router 2A. The remaining lease time information obtainment unit 122 then obtains, from the DHCP server 30, the remaining lease time of each user terminal 4 as remaining lease time information. Note that if the remaining lease time information obtainment unit 122 obtains the lease period (T) of each user terminal 4 and the information on the allocation time from the DHCP server 30 as the remaining lease time information, the remaining lease time is calculated by subtracting the allocation time from the current time to calculate the elapsed time and then subtracting the elapsed time from the lease period (T).

The submission order determination unit 123 determines the submission order, in order from the shortest remaining lease time, on the basis of the remaining lease time of each user terminal 4 obtained by the remaining lease time information obtainment unit 122. The submission order determination unit 123 then stores the remaining lease time of each user terminal 4 and the submission order in the storage unit 13 as submission order information 100 (FIG. 7).

Figure 7:
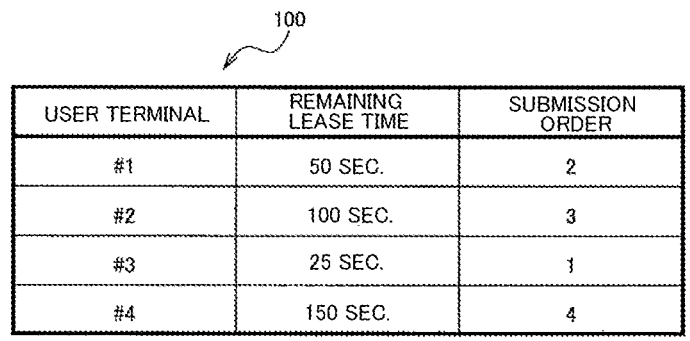
FIG. 7 is a diagram illustrating an example of the data structure of submission order information according to the first embodiment of the present invention.

FIG. 7 is a diagram illustrating an example of the data structure of the submission order information 100 according to the first embodiment of the present invention.

As illustrated in FIG. 7, the submission order information 100 holds, in association with the ID of the user terminal 4, the remaining lease time of that user terminal 4 and the submission order determined by the submission order determination unit 123.

In the example illustrated in FIG. 7, the user terminal 4-3 with an ID of "#3", and which has the shortest remaining lease time at "25 seconds", has a submission order of "1". The user terminal 4-1 with an ID of "#1", and which has the next-shortest remaining lease time at "50 seconds", has a submission order of "2". The subsequent submission order is determined on the basis of the remaining lease time in the same manner, and stored.

Returning to FIG. 5, the user configuration information submission unit 124 submits the user configuration information to the backup system edge router 2B determined as the switching destination by the device switching determination unit 121, in the submission order determined by the submission order determination unit 123.

Note that the user configuration DB 200 is stored in the storage unit 13, and the user configuration information 210 corresponding to each user terminal 4 is stored therein.

The reconnection inducement instruction unit 125 sends, to the DHCP server 30, an instruction to send the reconnection inducement information for the user terminal 4 for which the user configuration information submission unit 124 has submitted the user configuration information. As a result, the reconnection inducement unit 322 of the DHCP server 30 sends the reconnection inducement information (e.g., DHCP ForceRenew) to the user terminal 4.

Flow of Processing

The flow of processing by the edge switching system 1000 will be described next.

Figure 8:
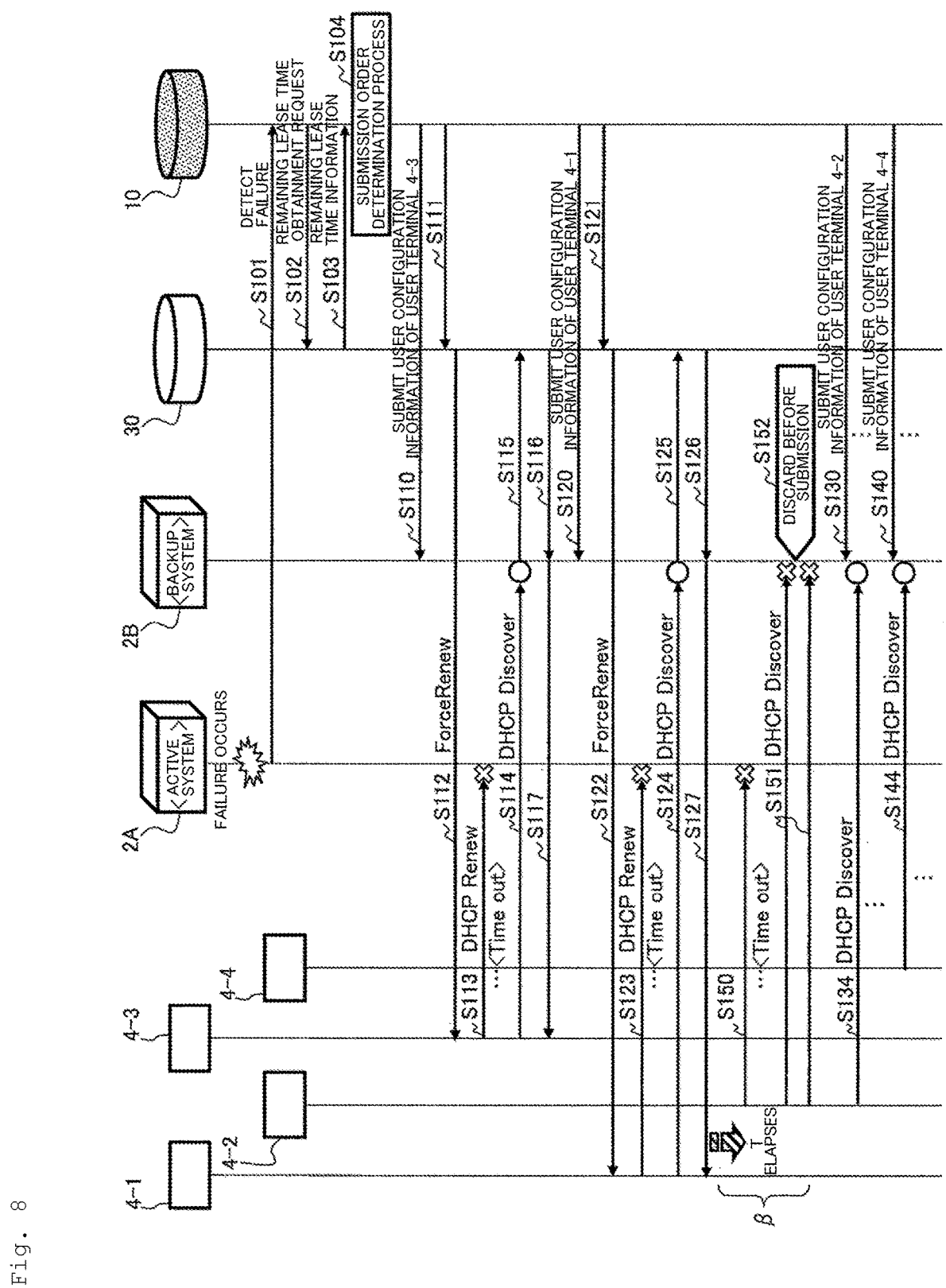
FIG. 8 is a sequence chart illustrating the flow of processing by the edge switching system according to the first embodiment of the present invention.

FIG. 8 is a sequence chart illustrating the flow of processing by the edge switching system 1000 according to the first embodiment of the present invention.

To simplify the descriptions, a case where the active system edge router 2A handles four user terminals 4 (4-1 to 4-4) will be described here.

As illustrated in FIG. 8, when a failure occurs in the active system edge router 2A, the edge switching device 10 (the device switching determination unit 121) detects the occurrence of the failure through a failure notification or the like from the active system edge router 2A (step S101). Then, the device switching determination unit 121 determines the backup system edge router 2B corresponding to the active system edge router 2A in which the failure has occurred as the device to which the switch is to be made.

Next, the edge switching device 10 (the remaining lease time information obtainment unit 122) sends, to the DHCP server 30, the remaining lease time obtainment request for the information on the remaining lease time of the user terminals 4 handled by the active system edge router 2A in which the failure has occurred (step S102).

Upon receiving the remaining lease time obtainment request, the DHCP server 30 (the lease period management unit 323) refers to the address allocation information 300 (FIG. 6) and sends the remaining lease time information to the edge switching device 10 (step S103).

Here, if the remaining lease time is stored in the address allocation information 300 (FIG. 6), the lease period management unit 323 sends the information of that remaining lease time to the edge switching device 10. On the other hand, if the remaining lease time is not stored in the address allocation information 300 (FIG. 6), the lease period management unit 323 sends the information of the lease period (T) of the address and the allocation time of the address to the edge switching device 10 as the remaining lease time information.

Next, the submission order determination unit 123 of the edge switching device 10 specifies the remaining lease time of each user terminal 4 on the basis of the remaining lease time information obtained from the DHCP server 30, and determines the submission order in order from the shortest remaining lease time (step S104: submission order determination process). The submission order determination unit 123 then stores the remaining lease time of each user terminal 4 and the determined submission order in the storage unit 13 as the submission order information 100 (FIG. 7).

Next, the user configuration information submission unit 124 of the edge switching device 10 submits the user configuration information of the user terminals 4 in order, according to the submission order indicated in the submission order information 100.

In the example in FIG. 7, first, the user configuration information submission unit 124 sends, to the backup system edge router 2B, the user configuration information of the user terminal 4-3 (#3), which has a submission order of "1" (step S110). As a result, the backup system edge router 2B stores the user configuration information of the user terminal 4-3 in itself.

Next, the reconnection inducement instruction unit 125 of the edge switching device 10 sends, to the DHCP server 30, an instruction to send the reconnection inducement information to the user terminal 4-3 (step S111).

Having received the instruction to send the reconnection inducement information, the DHCP server 30 (the reconnection inducement unit 322) sends the reconnection inducement information (DHCP ForceRenew) to the user terminal 4-3 (step S112).

Having received the reconnection inducement information, the user terminal 4-3 sends an address re-request message (DHCP Renew) to the active system edge router 2A (step S113). However, because a failure has occurred in the active system edge router 2A, an address cannot be obtained, resulting in a timeout. Accordingly, the user terminal 4-3 detects the occurrence of the failure in the active system edge router 2A and broadcasts an address request message (DHCP Discover) in order to redo the address allocation (step S114). The backup system edge router 2B receives the address request message (DHCP Discover) as a result.

Because the user configuration information of the user terminal 4-3 has already been submitted to the backup system edge router 2B, the address is allocated from the DHCP server 30 via the backup system edge router 2B (steps S115 to S117).

Next, the user configuration information submission unit 124 of the edge switching device 10 refers to the submission order information 100 (FIG. 7) and sends, to the backup system edge router 2B, the user configuration information of the user terminal 4-1 (#1) which has a submission order of "2" and therefore has the next-shortest remaining lease time (step S120). From step S121 on, the same processing as that for the user terminal 4-3 is performed, with the backup system edge router 2B receiving the address request message (DHCP Discover) from the user terminal 4-1 and an address being allocated by the DHCP server 30 (steps S121 to S127).

Additionally, the user configuration information submission unit 124 of the edge switching device 10 refers to the submission order information 100 (FIG. 7), and submits, to the backup system edge router 2B, the user configuration information of the user terminal 4-2 and the user terminal 4-4, according to the determined submission order (steps S130 and S140). As a result, the backup system edge router 2B resumes communication by receiving the address request message (DHCP Discover) from the user terminal 4-2 and the user terminal 4-4 (steps S134 and S144).

In this manner, with the edge switching system 1000 according to the first embodiment of the present invention, the edge switching device 10 determines a configuration order for the user configuration information, in order from the shortest remaining lease time, on the basis of the information of the remaining lease times of the user terminals 4, obtained from the DHCP server 30. As a result, compared to the system illustrated in FIG. 4, the user configuration information of a user terminal 4 having a shorter remaining lease time can be submitted to the backup system edge router 2B preferentially. This makes it possible to reduce DHCP Discover errors before configurations are submitted, and reduce the load on the edge routers 2.

Additionally, the edge switching device 10 can send the reconnection inducement information via the DHCP server 30, and reconfigure the addresses, for the user terminals 4 which have submitted the user configuration information. It is therefore possible to reduce the occurrence of situations in which even though the user configuration information of a user terminal 4 has already been submitted to the backup system edge router 2B after the switch and preparations for recovery are complete, the recovery is delayed and the failure period is therefore prolonged. In other words, the occurrence of delays in the recovery can be reduced.

Compared to the comparative example illustrated in FIG. 4, the edge switching system according to the first embodiment of the present invention provides a major effect of reducing the load on the edge routers 2, as described above; however, cases which cannot be handled, such as those described below, are also conceivable.

If, for a given user terminal 4, the lease period (T) of an address has run out before the user configuration information of that user terminal 4 reaches the backup system edge router 2B due to the determined submission order, an address request message (DHCP Discover) from that user terminal 4 will be discarded by the backup system edge router 2B even if the address request message is received. As indicated by the sign β in FIG. 8, for example, if the lease period (T) has run out before the user configuration information is submitted to the backup system edge router 2B for the user terminal 4-2 having the submission order of "3", the user terminal 4-2 sends an address re-request message (DHCP Renew) to the active system edge router 2A (step S150), and after a timeout, sends an address request message (DHCP Discover) to the backup system edge router 2B (step S151).

Here, the user configuration information of the user terminal 4-2 has not yet been submitted to the backup system edge router 2B. Accordingly, the user terminal 4-2 cannot accept the allocation of an address, and continues to send the address request message (DHCP Discover) at predetermined intervals until the address is successfully allocated by the DHCP server 30. Each time, the backup system edge router 2B, to which the user configuration information has not yet been submitted, continues to discard the address request (step S152). Accordingly, a case may arise in which the CPU resources of the backup system edge router 2B are consumed unnecessarily. In particular, when a large number of users are handled by the edge routers 2, the lease periods of the addresses themselves are short, and so on, address request messages (DHCP Discover) will arrive at a high frequency, and the submission of user configuration information may not be able to keep up even if the submission is performed on the basis of the determined submission order.

A second embodiment of the present invention will be described as a method for solving this additional problem.

Second Embodiment

Next, an edge switching system 1000A including an edge switching device 10A according to the second embodiment will be described.

Figure 10:
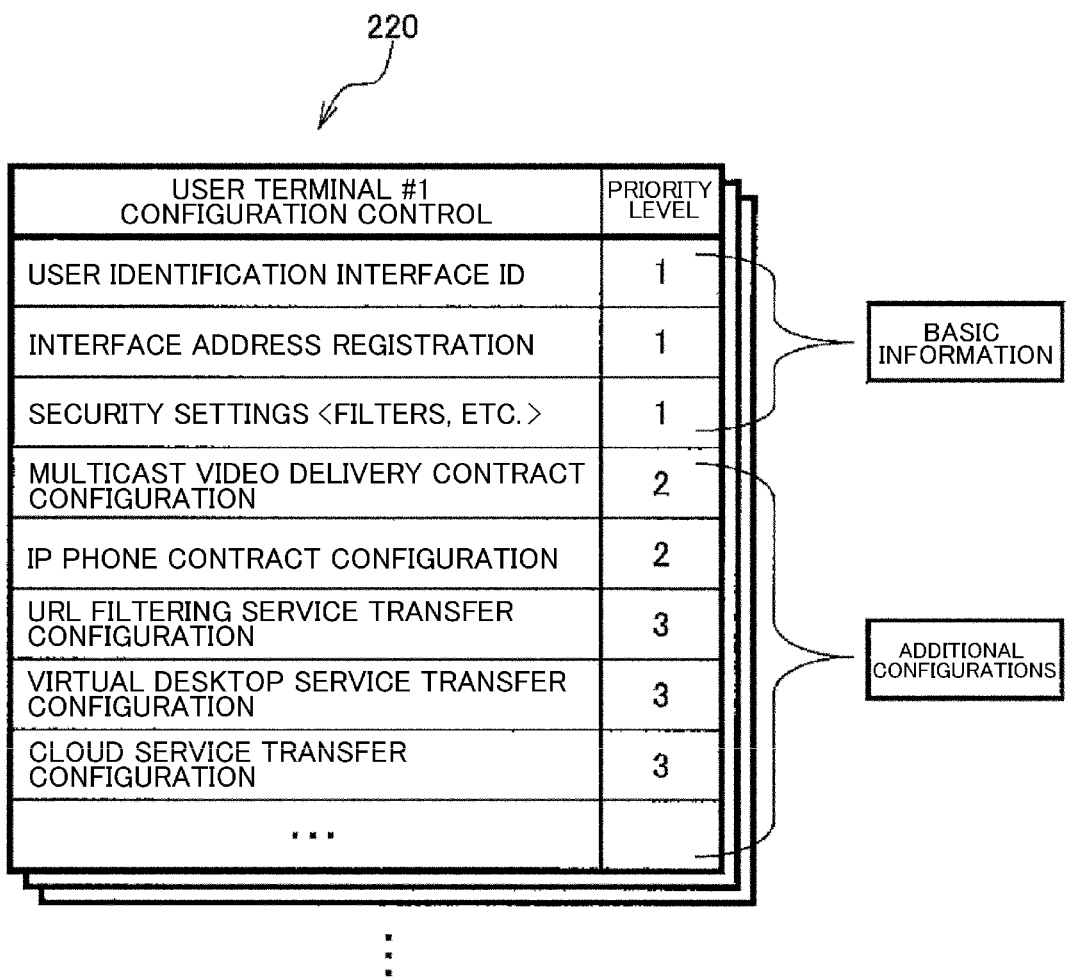
FIG. 10 is a diagram illustrating an example of the data structure of user configuration priority information according to the second embodiment of the present invention.

With the edge switching device 10A according to the second embodiment, the content of the user configuration information is divided according to a degree of priority with respect to connections thereof, and is registered as a priority level, as illustrated in FIG. 10, which will be described later. This preferentially restores configuration content that many users wish to be restored as soon as possible, e.g., Internet connections, and reduces the priority level of configuration content related to additional services to postpone the restoration thereof. Doing so makes it possible to quickly reduce the number of user terminals 4 for which services cannot be used at all, and more quickly restore services desired by users.

Figure 9:
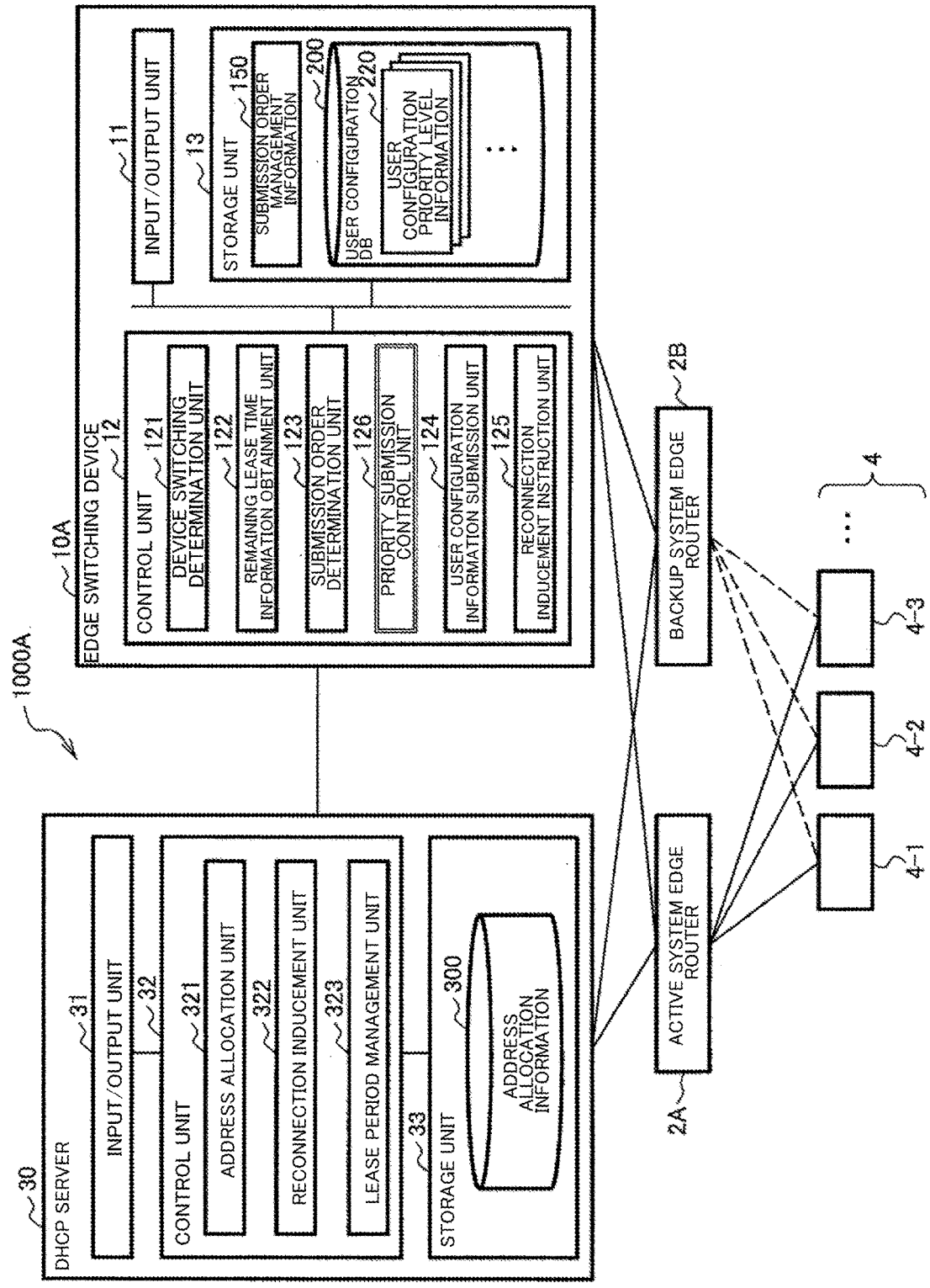
FIG. 9 is a diagram illustrating the overall configuration of an edge switching system including an edge switching device according to a second embodiment of the present invention.

FIG. 9 is a diagram illustrating the overall configuration of the edge switching system 1000A including the edge switching device 10A according to the second embodiment of the present invention.

The differences from the edge switching system 1000 illustrated in FIG. 5 are that the control unit 12 of the edge switching device 10A includes a priority submission control unit 126; and the information stored in the storage unit 13 is submission order management information 150 (illustrated in detail in FIG. 11) instead of the submission order information 100 (FIG. 7) and user configuration priority information 220 (illustrated in detail in FIG. 10) instead of the user configuration information 210 (FIG. 5). Note that functions having the same configurations as those of the edge switching system 1000 illustrated in FIG. 5 will be given the same names and reference signs, and will not be described in detail. The configuration of the DHCP server 30 in particular is the same in both the first embodiment and the second embodiment.

FIG. 10 is a diagram illustrating an example of the data structure of the user configuration priority information 220 according to the second embodiment of the present invention.

The user configuration priority information 220 is information in which a priority level is added to each piece of configuration content in the user configuration information of the user terminals 4. In other words, this is information in which the user configuration information is divided according to a priority level for restoring services. Of the user configuration information, a priority level of "1" is registered for information serving as a basic configuration (basic information). For example, "user identification interface ID", "interface address registration", and "security settings (filters, etc.)" are registered with a priority level of "1". This makes it possible to enable Internet connections to be used. This priority level "1" may also include, in advance, prerequisite configuration content for using optional services (additional configurations).

Additionally, in the user configuration priority information 220, information of additional configurations which are required for optional services are set with a priority level of "2", a priority level of "3", and so on. Only a single priority level may be configured for the additional configuration, e.g., priority level "2", or a plurality of priority levels may be configured, e.g., priority levels "2", "3", and so on. In the example in FIG. 10, "multicast video delivery contract configuration" and "IP phone contract configuration" are registered as a priority level of "2". In addition, "URL filtering service transfer configuration", "virtual desktop service transfer configuration", and "cloud service transfer configuration" are registered as priority level "3".

Note that the priority level of the individual contents of the user configuration information may be different for each user terminal 4. For example, content included in priority level "2" in the configuration of a given user terminal 4 may be set to priority level "1" in the configuration of another user terminal 4. Additionally, the user configuration priority information 220 is registered in advance in the user configuration DB 200 of the edge switching device 10A.

Figure 11:
FIG. 11 is a diagram illustrating an example of the data structure of submission order management information according to the second embodiment of the present invention.

FIG. 11 is a diagram illustrating an example of the data structure of the submission order management information 150 according to the second embodiment of the present invention.

The submission order management information 150 illustrated in FIG. 11 holds an item "priority level remaining configuration" in addition to the items in the submission order information 100 illustrated in FIG. 7. Like the submission order information 100 illustrated in FIG. 7, the "remaining lease time" in the submission order management information 150 holds information obtained by the remaining lease time information obtainment unit 122 from the DHCP server 30. Additionally, the submission order determined by the submission order determination unit 123 on the basis of the remaining lease time is held in "submission order".

When the configuration content indicated by the priority level in the user configuration priority information 220 (FIG. 10) of each user terminal 4 is not configured (not submitted), the configuration content indicated by that priority level is held in the "priority level remaining configuration" of the submission order management information 150. In other words, in an initial state, the configuration content indicated by all priority levels are registered in the "priority level remaining configuration", and when a submission to the backup system edge router 2B pertaining to configuration content of a priority level (e.g., priority level "1") is completed for a given user terminal 4, the configuration content of the priority level of "1" is deleted from the "priority level remaining configuration". This will be described in detail later with reference to FIG. 12.

Returning to FIG. 9, the priority submission control unit 126 refers to the submission order management information 150 (FIG. 11), and on the basis of the submission order determined by the submission order determination unit 123 and the priority level of the configuration content in the user configuration information, performs control for dividing the user configuration information and submitting the divided information to the backup system edge router 2B.

The priority submission control unit 126 determines divided user configuration information having a higher priority level as user configuration information to be submitted preferentially, on the basis of the determined submission order.

Specifically, the priority submission control unit 126 refers to the submission order management information 150 (FIG. 11), determines the submission for configuration content having the highest priority level of "1" (FIG. 10) in accordance with the submission order determined by the submission order determination unit 123, and causes that content to be submitted to the backup system edge router 2B via the user configuration information submission unit 124.

The priority submission control unit 126 holds a remaining lease time threshold ($L_{th}$) (a predetermined threshold pertaining to the remaining lease time) as information used to trigger the submission of configuration content having a lower priority level.

The priority submission control unit 126 compares the remaining lease time threshold ($L_{th}$) with the remaining lease time of the user terminal 4 corresponding to the user configuration information submitted preferentially, and if the remaining lease time is longer than the remaining lease time threshold ($L_{th}$), divided user configuration information having a lower priority level than the priority level of the user configuration information submitted preferentially is determined as the user configuration information to be submitted.

Specifically, when the submission of nth (where n is a positive integer) user configuration information (divided configuration content) is complete, the priority submission control unit 126 calculates a remaining lease time (L) for an n+1th submission. Then, when the user terminal 4 next in the submission order has a remaining lease time (L) greater than the remaining lease time threshold ($L_{th}$), the priority submission control unit 126 submits the configuration content having a low priority level (e.g., configuration content having a priority level of "2") for a user terminal 4 for which configuration content having the highest priority level (priority level "1") has already been submitted.

After the configuration content having a low priority level has been submitted as well, the priority submission control unit 126 calculates the remaining lease time (L) for the next (n+2th) submission, and submits the configuration content having the highest priority level (priority level "1") for that user terminal 4 at the point in time when the remaining lease time (L) becomes less than the remaining lease time threshold ($L_{th}$).

Note that the priority submission control unit 126 submits the configuration content having the highest priority level (priority level "1") in the same manner even if the lease period (T) has run out when the remaining lease time (L) is calculated.

The processing performed by the priority submission control unit 126 will be described in detail hereinafter with reference to FIG. 12.

Figure 12:
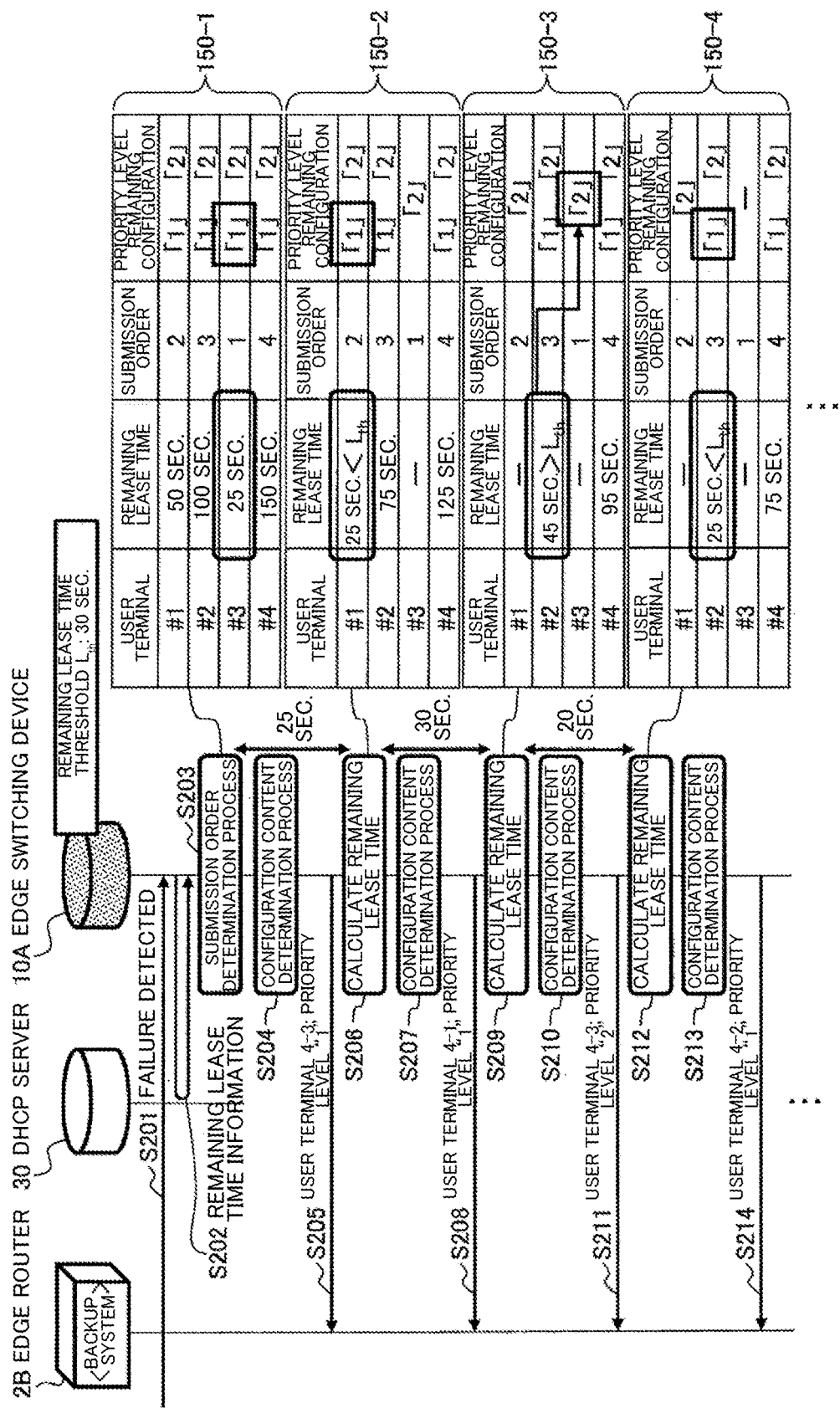
FIG. 12 is a diagram illustrating an overview of divided submission processing for user configuration information, executed by the edge switching system according to the second embodiment of the present invention.

FIG. 12 is a diagram illustrating an overview of the divided submission processing for the user configuration information, executed by the edge switching system 1000A according to the second embodiment of the present invention.

Here, the descriptions assume that the remaining lease time threshold ($L_{th}$) is 30 seconds.

Note also that the processing, illustrated in FIG. 12, that follows the submission of the user configuration information to the backup system edge router 2B based on the configuration content divided according to priority level is the same as the processing illustrated in FIG. 8 and will therefore not be described here.

First, when a failure occurs in the active system edge router 2A (not shown in FIG. 12), the edge switching device 10A (the device switching determination unit 121) detects the occurrence of the failure through a failure notification or the like from the active system edge router 2A (step S201).

Next, the edge switching device 10A (the remaining lease time information obtainment unit 122) obtains, from the DHCP server 30, the remaining lease time information of each user terminal 4 (step S202).

Next, the edge switching device 10A (the submission order determination unit 123) determines the submission order, in order from the shortest remaining lease time, for each user terminal 4 on the basis of the remaining lease time information obtained from the DHCP server 30 (step S203: submission order determination process). The edge switching device 10A (the submission order determination unit 123) then stores the remaining lease time of each user terminal 4 and the determined submission order in the submission order management information 150 (FIG. 11).

Here, the submission order management information 150 at the time of the initial configuration is assumed to be in the state of submission order management information 150-1 illustrated FIG. 12. Additionally, predetermined logic that executes the processing for determining the configuration content in the divided submission of the user configuration information (divided submission logic) will be described in detail later with reference to FIG. 13.

Next, the priority submission control unit 126 of the edge switching device 10A executes the processing for determining the configuration content in the divided submission of the user configuration information (step S204: configuration content determination process). Specifically, the priority submission control unit 126 refers to the submission order management information 150-1 and, in accordance with the submission order, determines, as the user configuration information to be submitted, the configuration content, having a priority level of "1", for the user terminal 4-3 (#3) which has the shortest remaining lease time and therefore as a submission order of "1". Then, the priority submission control unit 126 submits, to the backup system edge router 2B, the configuration content, having a priority level of "1", for the user terminal 4-3 (#3) that has been determined, via the user configuration information submission unit 124 (step S205).

Note that after the configuration content is submitted, the priority submission control unit 126 deletes the information of the submitted priority level from the "priority level remaining configuration" for that user terminal 4 in the submission order management information 150-1. Here, the priority level "1" of the user terminal 4-3 (#3) is deleted.

Next, after the submission in step S205 is complete, the priority submission control unit 126 calculates the remaining lease time (step S206). Here, the remaining lease time is calculated as indicated by submission order management information 150-2, under the assumption that 25 seconds have passed following the obtainment of the remaining lease time information of each user terminal 4 in step S202.

Then, the priority submission control unit 126 executes the processing for determining the configuration content in the divided submission of the user configuration information (step S207: configuration content determination process). Here, the priority submission control unit 126 refers to the submission order management information 150-2, and compares the remaining lease time (L) with the remaining lease time threshold ($L_{th}$) for the user terminal 4-1 (#1) having a submission order of "2". The priority submission control unit 126 then determines that 25 seconds (L) is less than 30 seconds ($L_{th}$). In this case, the priority submission control unit 126 determines, as the user configuration information to be submitted, the configuration content, which has a priority level of "1", of the user terminal 4-1 (#1) having a submission order of "2". Then, the priority submission control unit 126 submits, to the backup system edge router 2B, the configuration content, having a priority level of "1", for the user terminal 4-1 (#1) that has been determined, via the user configuration information submission unit 124 (step S208).

Note that after the configuration content is submitted, the priority submission control unit 126 deletes the information of the submitted priority level from the "priority level remaining configuration" for that user terminal 4 in the submission order management information 150-2. Here, the priority level "1" of the user terminal 4-1 (#1) is deleted.

Next, after the submission in step S208 is complete, the priority submission control unit 126 calculates the remaining lease time (step S209). Here, the remaining lease time is calculated as indicated by submission order management information 150-3, under the assumption that 30 seconds have passed following the calculation of the remaining lease time in step S206.

Then, the priority submission control unit 126 executes the processing for determining the configuration content in the divided submission of the user configuration information (step S210: configuration content determination process). Here, the priority submission control unit 126 refers to the submission order management information 150-3, and compares the remaining lease time (L) with the remaining lease time threshold ($L_{th}$) for the user terminal 4-2 (#2) having a submission order of "3". The priority submission control unit 126 then determines that 45 seconds (L) is greater than 30 seconds ($L_{th}$). In this case, the priority submission control unit 126 submits the configuration content having a low priority level (e.g., configuration content having a priority level of "2") for a user terminal 4 for which configuration content having the highest priority level (priority level "1") has already been submitted. It is assumed here that the priority submission control unit 126 determines, as the user configuration information to be submitted, the configuration content, having a priority level of "2", for the user terminal 4-3 (#3) for which configuration content having the highest priority level (priority level "1") has already been submitted. Then, the priority submission control unit 126 submits, to the backup system edge router 2B, the configuration content, having a priority level of "2", for the user terminal 4-3 (#3) that has been determined, via the user configuration information submission unit 124 (step S211).

Note that after the configuration content is submitted, the priority submission control unit 126 deletes the information of the submitted priority level from the "priority level remaining configuration" for that user terminal 4 in the submission order management information 150-3. Here, the priority level "2" of the user terminal 4-3 (#3) is deleted.

Here, the priority submission control unit 126 selects the user terminal 4-3 (#3) among the user terminals 4 for which the configuration content having the highest priority level (priority level "1") has already been submitted, and submits configuration content having a priority level of "2". However, for example, the configuration content having a priority level of "2" of the user terminal 4-1 (#1) may be submitted to the backup system edge router 2B. In other words, which user terminal 4 is given priority for the submission of the configuration content having a priority level of "2" may be determined at random, may be set in advance, or may follow the order indicated by the submission order.

Next, after the submission in step S211 is complete, the priority submission control unit 126 calculates the remaining lease time (step S212). Here, the remaining lease time is calculated as indicated by submission order management information 150-4, under the assumption that 20 seconds have passed following the calculation of the remaining lease time in step S209.

Then, the priority submission control unit 126 executes the processing for determining the configuration content in the divided submission of the user configuration information (step S213: configuration content determination process). Here, the priority submission control unit 126 refers to the submission order management information 150-4, and compares the remaining lease time (L) with the remaining lease time threshold ($L_{th}$) for the user terminal 4-2 (#2) which has a submission order of "3", i.e., the youngest, in the submission order, among the user terminals 4 for which the submission of the configuration content having a priority level of "1" is not yet complete. The priority submission control unit 126 then determines that 25 seconds (L) is less than 30 seconds ($L_{th}$). In this case, the priority submission control unit 126 determines, as the user configuration information to be submitted, the configuration content, which has a priority level of "1", of the user terminal 4-2 (#2). Next, the priority submission control unit 126 submits, to the backup system edge router 2B, the configuration content, having a priority level of "1", for the user terminal 4-2 (#2) that has been determined, via the user configuration information submission unit 124 (step S214).

Note that after the configuration content is submitted, the priority submission control unit 126 deletes the information of the submitted priority level from the "priority level remaining configuration" for that user terminal 4 in the submission order management information 150-4. Here, the priority level "1" of the user terminal 4-2 (#2) is deleted.

The priority submission control unit 126 continues this processing until all the configuration content having the priority level indicated by the priority level remaining configuration has been submitted.

In this manner, the edge switching device 10A can divide the user configuration information on the basis of priority levels of the content thereof and submit the divided information to the backup system edge router 2B. As a result, configuration content that many users wish to be restored as soon as possible, e.g., Internet connections, can be restored preferentially, and the priority level of configuration content related to additional services can be reduced to postpone the restoration thereof. Doing so makes it possible to quickly reduce the number of user terminals 4 for which services cannot be used at all, and more quickly restore services desired by users.

Flow of Processing

The flow of processing for determining the configuration content in the divided submission of user configuration information, executed by the edge switching device 10A of the edge switching system 1000A, will be described in detail next. Note that the overall flow of the processing by the edge switching system 1000A is the same as the processing illustrated in FIG. 8, aside from the division of the user configuration information of each user terminal 4 and the submission to the backup system edge router 2B.

Figure 13:
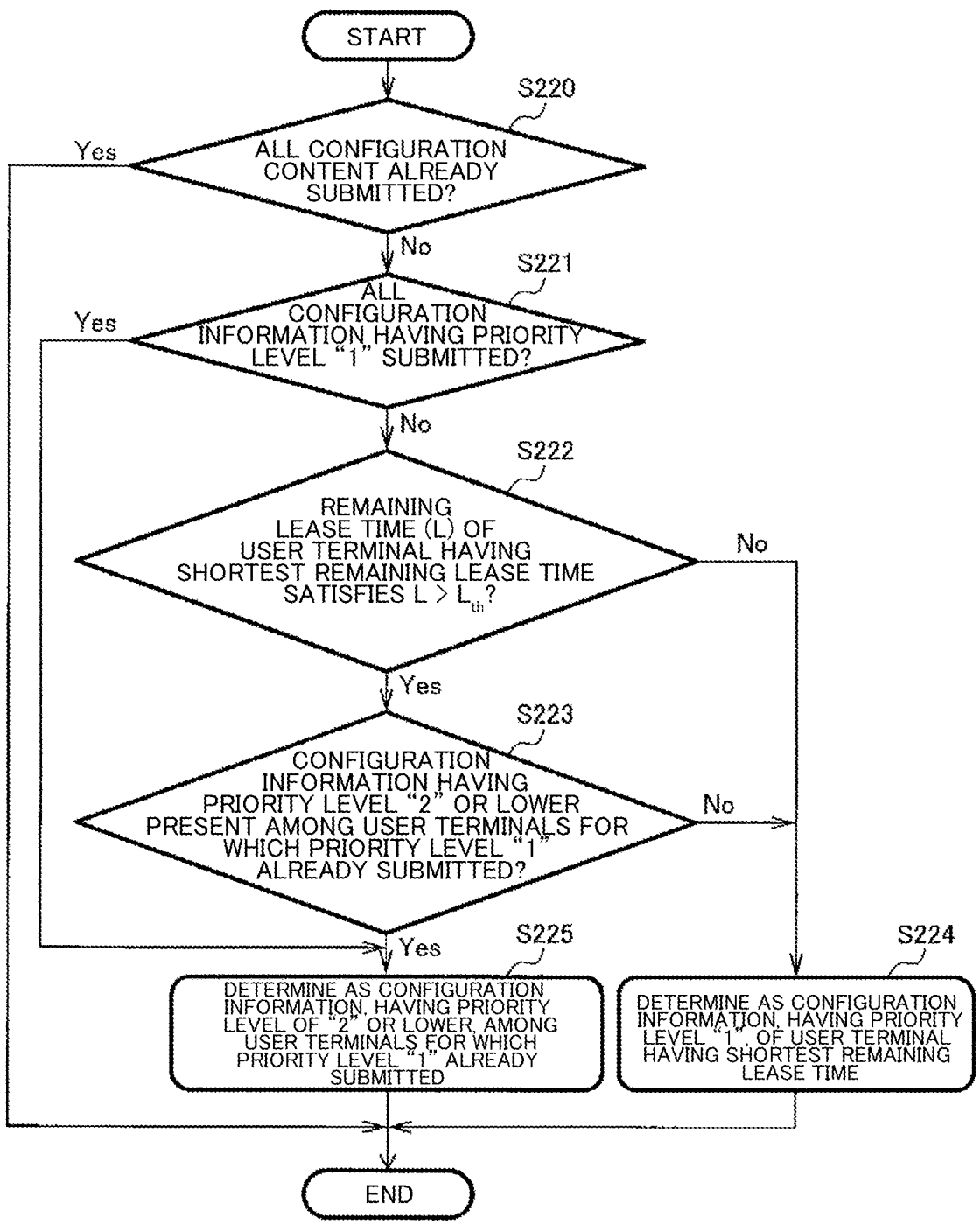
FIG. 13 is a flowchart illustrating the flow of processing for determining configuration content in divided submission of the user configuration information executed by the edge switching device according to the second embodiment of the present invention.

FIG. 13 is a flowchart illustrating the flow of processing for determining configuration content in divided submission of the user configuration information executed by the edge switching device 10A according to the second embodiment of the present invention.

The flowchart in FIG. 13 illustrates the processing of determining for which user terminal 4 the priority level configuration content is to be submitted in steps S204, S207, S210, and S213 of FIG. 12 (predetermined divided submission logic). Note that the submission order management information 150 (FIG. 11) referred to by the priority submission control unit 126 is, at the initial stage, information in a state in which the remaining lease time, the submission order, and the remaining priority level configuration of each user terminal 4, obtained from the DHCP server 30, are stored, and later becomes information in which the information of the remaining lease time and the priority level remaining configuration is updated.

First, the priority submission control unit 126 of the edge switching device 10A refers to the "priority level remaining configuration" in the submission order management information 150, and determines whether or not all of the user configuration information configuration content has already been submitted (step S220). Here, if all of the user configuration information configuration content has already been submitted (step S220→Yes), the processing ends. Note that the priority submission control unit 126 can refer to the "priority level remaining configuration" item in the submission order management information 150 and, if there is no configuration content remaining for each priority level, determine that all the configuration content has been submitted.

On the other hand, if configuration content which has not been submitted remains (step S220→No), the processing moves to step S221.

In step S221, the priority submission control unit 126 refers to the "priority level remaining configuration" in the submission order management information 150, and determines whether or not the configuration information having a priority level of "1" has been submitted for all of the user terminals 4. If the configuration information having a priority level of "1" has been submitted for all of the user terminals 4 (step S221→Yes), the processing moves to step S225. On the other hand, if the configuration information having a priority level of "1" has not been submitted for all of the user terminals 4 (step S221→No), i.e., if configuration information having a priority level of "1" which has not been submitted remains, the processing moves to step S222.

In step S222, the priority submission control unit 126 refers to the "remaining lease time" for each user terminal 4 in the submission order management information 150, and determines whether or not the remaining lease time (L) of the user terminal 4 having the shortest remaining lease time is longer than the remaining lease time threshold ($L_{th}$), i.e., whether or not (L)>($L_{th}$) is satisfied.

Here, if the remaining lease time (L) is not longer than the remaining lease time threshold ($L_{th}$) (step S222→No), the priority submission control unit 126 determines, as the user configuration information to be submitted, the configuration information, having a priority level of "1", of the user terminal 4 having the shortest remaining lease time (step S224), after which the processing ends. On the other hand, if the remaining lease time (L) is longer than the remaining lease time threshold ($L_{th}$) (step S222→Yes), the processing moves to step S223.

In step S223, the priority submission control unit 126 refers to the "priority level remaining configuration" in the submission order management information 150, and determines whether or not there is unsubmitted configuration information having a priority level of "2" or lower, among the user terminals 4 for which the configuration information having a priority level of "1" has already been submitted. Here, if there is no unsubmitted configuration information having a priority level of "2" or lower (step S223→No), the priority submission control unit 126 determines, as the user configuration information to be submitted, the configuration information, having a priority level of "1", of the user terminal 4 having the shortest remaining lease time (step S224), after which the processing ends. On the other hand, if there is unsubmitted configuration information having a priority level of "2" or lower (step S223→Yes), the processing moves to step S225.

In step S225, the priority submission control unit 126 refers to the "priority level remaining configuration" in the submission order management information 150 and determines, on the basis of predetermined logic, one instance of the unsubmitted configuration information having a priority level of "2" or lower as the user configuration information to be submitted, from among the user terminals 4 for which configuration information having a priority level of "1" has already been submitted, after which the processing ends. The predetermined logic to be used here includes preconfigured processing such as, for example, selecting in order from highest priority level and youngest in configuration order, or when the order is from the highest priority level and there are a plurality of instances of configuration information having the same priority level, determining one of those priority levels at random.

In this manner, with the edge switching system 1000A according to the second embodiment of the present invention, the edge switching device 10 divides the content of the user configuration information according to a degree of priority with respect to connections thereof, and registers this as a priority level. As a result, the edge switching device 10a can preferentially restore configuration content that many users wish to be restored as soon as possible, and reduce the priority level of configuration content related to additional services and restore those services. This makes it possible to quickly reduce the number of user terminals 4 for which services cannot be used at all, and more quickly restore services desired by users. As a result, the level of satisfaction of users regarding the use of services can be increased.

Hardware Configuration

Figure 14:
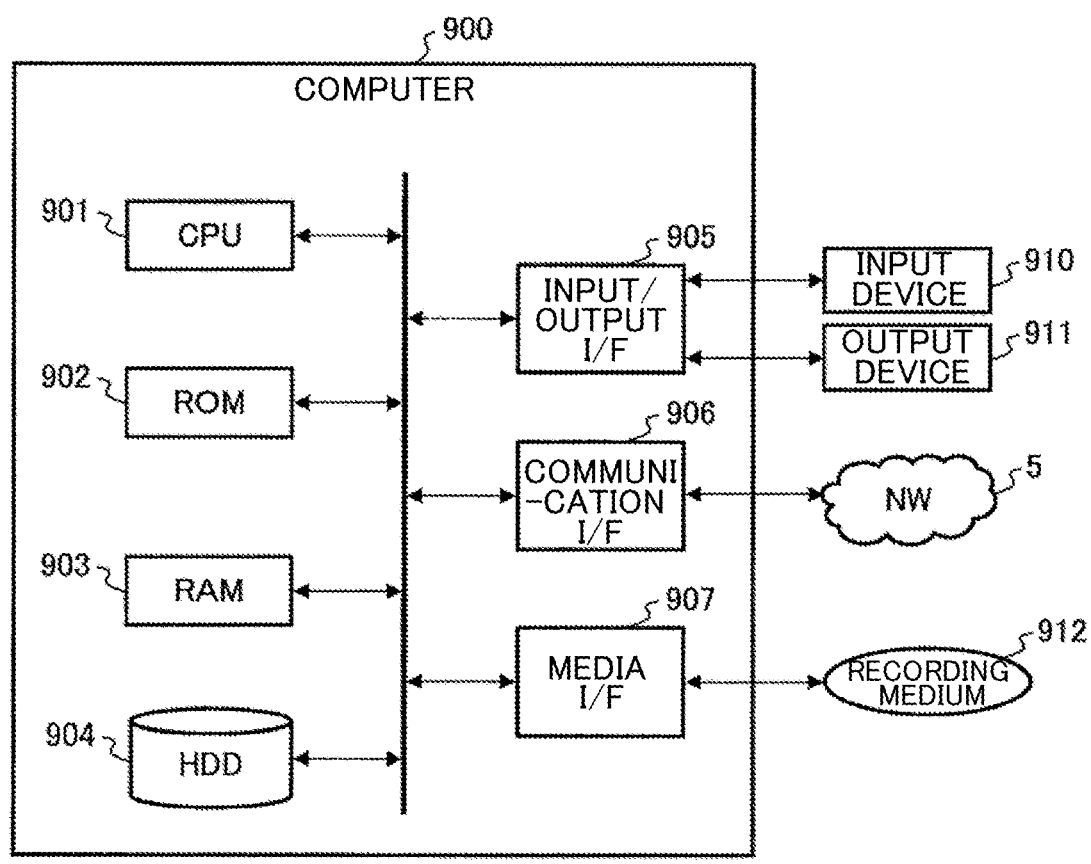
FIG. 14 is a hardware configuration diagram illustrating an example of a computer that implements functions of the edge switching device according to an embodiment.

The edge switching devices 10 and 10A according to the present embodiment are implemented by a computer 900 having the configuration illustrated in FIG. 14, for example.

FIG. 14 is a hardware configuration diagram illustrating an example of the computer 900 that implements functions of the edge switching devices 10 and 10A according to the present embodiment. The computer 900 includes a CPU (Central Processing Unit) 901, ROM (Read Only Memory) 902, RAM (Random Access Memory) 903, an HDD (Hard Disk Drive) 904, an input/output I/F (Interface) 905, a communication I/F 906, and a media I/F 907.

The CPU 901 operates on the basis of programs stored in the ROM 902 or the HDD 904, and performs control through the control unit 12 (FIG. 5, FIG. 9). The ROM 902 stores a boot program executed by the CPU 901 when the computer 900 is started up, programs pertaining to the hardware of the computer 900, and the like.

The CPU 901 controls an input device 910 such as a mouse or a keyboard, an output device 911 such as a display or a printer, and the like through the input/output I/F 905. The CPU 901 obtains data from the input device 910 via the input/output I/F 905, and also outputs generated data to the output device 911. Along with the CPU 901, a GPU (Graphics Processing Unit) or the like may be used as a processor.

The HDD 904 stores programs executed by the CPU 901, data used by the programs, and the like. The communication I/F 906 receives data from other devices (e.g., the DHCP server 30, the edge routers 2, or the like) over a communication network (e.g., a NW (Network) 5) and outputs the data to the CPU 901, and also sends data generated by the CPU 901 to other devices over the communication network.

The media I/F 907 reads programs or data stored in a recording medium 912 and outputs the programs or data to the CPU 901 via the RAM 903. The CPU 901 loads the program pertaining to desired processing from the recording medium 912 via the media I/F 907 into the RAM 903 and executes the loaded program. The recording medium 912 is an optical recording medium such as DVD (Digital Versatile Disc), a PD (Phase change rewritable disk), or the like, a magneto-optical recording medium such as an MO (Magneto Optical disk) or the like, a magnetic recording medium, a conductor memory tape medium or semiconductor memory, or the like.

For example, when the computer 900 functions as the edge switching devices 10 and 10A according to the first and second embodiments of the present invention, the CPU 901 of the computer 900 realizes the functions of the edge switching devices 10 and 10A by executing programs loaded into the RAM 903. The data in the RAM 903 is stored in the HDD 904. The CPU 901 reads the programs pertaining to the desired processing from the recording medium 912 and executes the programs. In addition, the CPU 901 may read the program for the desired processing from other devices via the communication network (the NW 5).

Effects

Effects of the edge switching system and the like including the edge switching device according to the present invention will be described hereinafter.

An edge switching system according to the present invention is an edge switching system 1000 including an edge switching device 10 and a DHCP server 30, the edge switching device 10 switching between an edge router 2A of an active system and an edge router 2B of a backup system, and the DHCP server 30 allocating addresses in response to requests from a plurality of user terminals 4 via the edge routers 2. The DHCP server 30 includes: a storage unit 33 that stores, for each of the user terminals 4, remaining lease time information pertaining to a remaining time of an address lease period that allows the addresses to be used by the user terminals 4; a lease period management unit 323 that sends the remaining lease time information for each of the user terminals 4 to the edge switching device 10; and a reconnection inducement unit 322 that accepts, from the edge switching device 10, an instruction to send reconnection inducement information inducing the user terminals 4 to reconnect to the edge routers 2, and sends the reconnection inducement information to the user terminals 4. The edge switching device 10 includes: a remaining lease time information obtainment unit 122 that obtains, from the DHCP server 30, the remaining lease time information for each of the user terminals 4 when switching from the edge router 2A of the active system to the edge router 2B of the backup system; a submission order determination unit 123 that specifies a remaining lease time of each of the user terminals 4 using the remaining lease time information, and determines a submission order of user configuration information in order from a shortest remaining lease time; a user configuration information submission unit 124 that submits user configuration information of each of the user terminals 4 to the edge router 2B of the backup system in accordance with the determined submission order; and a reconnection inducement instruction unit 125 that sends, to the DHCP server 30, an instruction to send the reconnection inducement information for the user terminals 4 for which the user configuration information has been submitted.

In this manner, according to the edge switching system 1000, the edge switching device 10 determines a configuration order for the user configuration information, in order from the shortest remaining lease time, on the basis of the information of the remaining lease times of the user terminals 4, obtained from the DHCP server 30. As a result, the user configuration information of a user terminal 4 having a shorter remaining lease time can be submitted to the backup system edge router 2B preferentially. This makes it possible to reduce situations in which address request messages (e.g., DHCP Discover) are repeatedly discarded before configurations are submitted, and reduce the load on the edge routers 2. Additionally, the edge switching device 10 can send the reconnection inducement information via the DHCP server 30, and reconfigure the addresses, for the user terminals 4 which have submitted the user configuration information. It is therefore possible to reduce the occurrence of situations in which even though the user configuration information of a user terminal 4 has already been submitted to the backup system edge router 2B after the switch and preparations for recovery are complete, the recovery is delayed and the failure period is therefore prolonged. In other words, the occurrence of delays in the recovery can be reduced.

Additionally, in the edge switching system 1000A, the edge switching device 10A includes: a storage unit 13 that stores, for each of the user terminals 4, the user configuration information as user configuration information divided according to a priority level at which a service is to be restored; and a priority submission control unit 126 that determines the divided user configuration information having a higher priority level as user configuration information to be submitted preferentially, on the basis of the submission order that has been determined.

In this manner, the edge switching device 10A sets priority levels for the user configuration information to be higher for configuration content pertaining to services which a user wishes to be restored more quickly, for example, and stores the user configuration information divided by the priority level. Then, on the basis of the submission order determined by the submission order determination unit 123, the edge switching device 10A can send the divided user configuration information having a higher priority level. Therefore, in a larger number of user terminals 4, priority can be given to restoring even only some of the services desired by the user, which makes it possible to improve the service quality.

Additionally, in the edge switching system 1000A, the priority submission control unit 126 of the edge switching device 10A compares a predetermined threshold pertaining to the remaining lease time with the remaining lease time of a user terminal corresponding to the user configuration information submitted preferentially, and when the remaining lease time is longer than the predetermined threshold, the divided user configuration information having a priority level lower than the priority level of the user configuration information submitted preferentially is determined as the user configuration information to be submitted.

By doing so, when divided user configuration information having a higher priority level is to be submitted, the edge switching device 10A can submit divided user configuration information having a lower priority level when the remaining lease time for that user terminal is longer than the predetermined threshold. This makes it possible to efficiently submit the divided user configuration information without increasing the load on the edge routers 2.

Note that the present invention is not limited to the embodiments described thus far, and many modifications can be made within the technical spirit of the present invention by one of ordinary skill in the art.

REFERENCE SIGNS LIST

2 Edge router
2A Active system edge router
2B Backup system edge router
4 User terminal
10, 10A Edge switching device
11, 31 Input/output unit
12, 32 Control unit
13, 33 Storage unit
30 DHCP server
100 Submission order information
150 Submission order management information
121 Device switching determination unit
122 Remaining lease time information obtainment unit
123 Submission order determination unit
124 User configuration information submission unit
125 Reconnection inducement instruction unit
126 Priority submission control unit
200 User configuration DB
210 User configuration information
220 User configuration priority information
300 Address allocation information
321 Address allocation unit
322 Reconnection inducement unit
323 Lease period management unit

The invention claimed is:

1. An edge switching system comprising an edge switching device and a dynamic host configuration protocol (DHCP) server, the edge switching device switching between an edge router of an active system and an edge router of a backup system, and the DHCP server allocating addresses in response to requests from a plurality of user terminals via the edge routers, wherein:
the DHCP server is implemented using one or more computers, and includes:
a storage device configured to store, for each of the user terminals, remaining lease time information pertaining to a remaining time of an address lease period that allows the addresses to be used by the user terminals;
a lease period management unit, implemented using the one or more computers, configured to send the remaining lease time information for each of the user terminals to the edge switching device; and
a reconnection inducement unit, implemented using the one or more computers, configured to (i) accept, from the edge switching device, an instruction to send reconnection inducement information inducing the user terminals to reconnect to the edge routers, and (ii) send the reconnection inducement information to the user terminals, and
the edge switching device is implemented using at least one computer, and includes:
a remaining lease time information obtainment unit, implemented using the at least one computer, configured to obtain, from the DHCP server, the remaining lease time information for each of the user terminals when switching from the edge router of the active system to the edge router of the backup system;
a submission order determination unit, implemented using the at least one computer, configured to (i) specify a remaining lease time of each of the user terminals using the remaining lease time information, and (ii) determine a submission order of user configuration information in order from a shortest remaining lease time;
a user configuration information submission unit, implemented using the at least one computer, configured to submit user configuration information of each of the user terminals to the edge router of the backup system in accordance with the determined submission order; and
a reconnection inducement instruction unit, implemented using the at least one computer, configured to send, to the DHCP server, an instruction to send the reconnection inducement information for the user terminals for which the user configuration information has been submitted.

2. The edge switching system according to claim 1, wherein the edge switching device includes:
a storage device configured to store, for each of the user terminals, the user configuration information as user configuration information divided according to a priority level at which a service is to be restored; and a priority submission control unit, implemented using the at least one computer, configured to determine the divided user configuration information having a higher priority level as user configuration information to be submitted preferentially, on the basis of the submission order that has been determined.

3. The edge switching system according to claim 2, wherein the priority submission control unit, implemented using the at least one computer, is configured to compare a predetermined threshold pertaining to the remaining lease time with the remaining lease time of a user terminal corresponding to the user configuration information submitted preferentially, and when the remaining lease time is longer than the predetermined threshold, the divided user configuration information having a priority level lower than the priority level of the user configuration information submitted preferentially is determined as the user configuration information to be submitted.

4. An edge switching device in an edge switching system comprising the edge switching device and a dynamic host configuration protocol (DHCP) server, the edge switching device switching between an edge router of an active system and an edge router of a backup system, the DHCP server allocating addresses in response to requests from a plurality of user terminals via the edge routers, and the edge switching device comprising:

a remaining lease time information obtainment unit, implemented using one or more computers, configure to obtain, from the DHCP server, remaining lease time information for each of the user terminals, the remaining lease time information pertaining to a remaining time of an address lease period that allows the addresses to be used, when switching from the edge router of the active system to the edge router of the backup system;

a submission order determination unit, implemented using the one or more computers, configured to (i) specify a remaining lease time of each of the user terminals using the remaining lease time information, and (ii) determine a submission order of user configuration information in order from a shortest remaining lease time;

a user configuration information submission unit, implemented using the one or more computers, configured to submit user configuration information of each of the user terminals to the edge router of the backup system in accordance with the determined submission order; and a reconnection inducement instruction unit, implemented using the one or more computers, configured to send, to the DHCP server, an instruction to send reconnection inducement information for the user terminals for which the user configuration information has been submitted, the reconnection inducement information inducing a reconnection to the edge routers.

5. The edge switching device according to claim 4, comprising:

a storage device configured to store, for each of the user terminals, the user configuration information as user configuration information divided according to a priority level at which a service is to be restored; and a priority submission control unit, implemented using the one or more computers, configured to determine the divided user configuration information having a higher priority level as user configuration information to be submitted preferentially, on the basis of the submission order that has been determined.

6. The edge switching device according to claim 5, wherein the priority submission control unit, implemented using the one or more computers, is configured to compare a predetermined threshold pertaining to the remaining lease time with the remaining lease time of a user terminal corresponding to the user configuration information submitted preferentially, and when the remaining lease time is longer than the predetermined threshold, the divided user configuration information having a priority level lower than the priority level of the user configuration information submitted preferentially is determined as the user configuration information to be submitted.

7. An edge switching method executed by an edge switching device, implemented using one or more computers, in an edge switching system including the edge switching device and a DHCP server, the edge switching device switching between an edge router of an active system and an edge router of a backup system, the DHCP server allocating addresses in response to requests from a plurality of user terminals via the edge routers, and the method comprising:

obtaining, from the DHCP server, remaining lease time information for each of the user terminals, the remaining lease time information pertaining to a remaining time of an address lease period that allows the addresses to be used, when switching from the edge router of the active system to the edge router of the backup system;

specifying a remaining lease time of each of the user terminals using the remaining lease time information;

determining a submission order of user configuration information in order from a shortest remaining lease time;

submitting user configuration information of each of the user terminals to the edge router of the backup system in accordance with the determined submission order; and sending, to the DHCP server, an instruction to send reconnection inducement information for the user terminals for which the user configuration information has been submitted, the reconnection inducement information inducing a reconnection to the edge routers.

* * * * *